US012667839B2

(12) United States Patent
Waterman

(10) Patent No.: US 12,667,839 B2
(45) **Date of Patent: *Jun. 30, 2026**

(54) MICROFLUIDIC DEVICE

(71) Applicant: Oxford Nanopore Technologies PLC, Oxford (GB)

(72) Inventor: David Waterman, Oxford (GB)

(73) Assignee: Oxford Nanopore Technologies PLC, Oxford (GB)

( * ) Notice: Subject to any disclaimer, the term of this patent is extended or adjusted under 35 U.S.C. 154(b) by 9 days.

This patent is subject to a terminal disclaimer.

(21) Appl. No.: 18/103,815

(22) Filed: Jan. 31, 2023

(65) Prior Publication Data

US 2023/0311118 A1 Oct. 5, 2023

Related U.S. Application Data

(63) Continuation of application No. 16/315,602, filed as application No. PCT/GB2017/051991 on Jul. 6, 2017, now Pat. No. 11,596,940.

(30) Foreign Application Priority Data

Jul. 6, 2016 (GB) ..................................... 1611770

(51) Int. Cl.
*B01L 3/00* (2006.01)

(52) U.S. Cl.
CPC ... *B01L 3/502715* (2013.01); *B01L 3/502738* (2013.01); *B01L 3/502746* (2013.01);
(Continued)

(58) Field of Classification Search
CPC ......... B01L 3/502715; B01L 3/502738; B01L 3/502746; B01L 2200/0621;
(Continued)

(56) References Cited

U.S. PATENT DOCUMENTS

| | | | |
|---|---|---|---|
| 3,799,743 | A | 3/1974 | Alexander et al. |
| 4,154,795 | A | 5/1979 | Thorne |

(Continued)

FOREIGN PATENT DOCUMENTS

| | | | |
|---|---|---|---|
| AU | 2003240941 | A1 | 12/2003 |
| CN | 1303147 | A | 7/2001 |

(Continued)

OTHER PUBLICATIONS

U.S. Appl. No. 18/085,060, filed Dec. 20, 2022, Hyde et al.

(Continued)

*Primary Examiner* — Samuel P Siefke
(74) *Attorney, Agent, or Firm* — Wolf, Greenfield & Sacks, P.C.

(57) ABSTRACT

A microfluidic device comprises: a sensor provided in a sensing chamber; a liquid inlet and liquid outlet connecting to the sensor chamber for respectively passing liquid into and out of the sensing chamber and; a sample input port in fluid communication with the liquid inlet; a liquid collection channel downstream of the sensing chamber outlet; a flow path interruption between the liquid outlet and the liquid collection channel, preventing liquid from flowing into the liquid collection channel from upstream; a buffer liquid filling from the sample input port to the sensing chamber, and filling the sensing chamber and filing from the liquid outlet to the flow path interruption; an activation system operable to complete the flow path between the liquid outlet and the liquid collection channel such that the sensor remains unexposed to gas or a gas/liquid interface.

21 Claims, 7 Drawing Sheets

(52) U.S. Cl.
CPC .................. *B01L 2200/0621* (2013.01); *B01L 2200/0684* (2013.01); *B01L 2300/0636* (2013.01); *B01L 2300/0645* (2013.01); *B01L 2300/0816* (2013.01); *B01L 2300/087* (2013.01); *B01L 2300/14* (2013.01); *B01L 2300/161* (2013.01); *B01L 2300/165* (2013.01); *B01L 2400/0406* (2013.01); *B01L 2400/0644* (2013.01)

(58) Field of Classification Search
CPC ..... B01L 2200/0684; B01L 2300/0636; B01L 2300/0645; B01L 2300/0816; B01L 2300/087; B01L 2300/14; B01L 2300/161; B01L 2300/165; B01L 2400/0406; B01L 2400/0644
See application file for complete search history.

(56) References Cited

U.S. PATENT DOCUMENTS 5,234,566 A 8/1993 Osman et al.
5,290,240 A 3/1994 Horres, Jr.
5,403,451 A 4/1995 Riviello et al.
5,503,803 A 4/1996 Brown et al.
6,056,922 A 5/2000 Ikematsu
6,300,141 B1 10/2001 Segal et al.
6,479,288 B1 11/2002 Laffafian et al.
6,483,931 B2 11/2002 Kalnitsky et al.
6,503,452 B1 1/2003 Boxer et al.
6,699,697 B2 3/2004 Klemic et al.
6,863,833 B1 3/2005 Bloom et al.
6,913,697 B2 7/2005 Lopez et al.
6,916,488 B1 7/2005 Meier et al.
7,077,939 B1 7/2006 Crooks et al.
7,144,486 B1 12/2006 Fritsch et al.
7,169,272 B2 1/2007 Fritsch et al.
7,294,247 B1 11/2007 Tian et al.
7,745,116 B2 6/2010 Williams
7,939,270 B2 5/2011 Holden et al.
8,124,191 B2 2/2012 Ervin et al.
8,461,854 B2 6/2013 Chen et al.
9,057,102 B2 6/2015 Turner et al.
9,546,400 B2 1/2017 Turner et al.
9,556,480 B2 1/2017 Turner et al.
9,613,247 B2 4/2017 Yang
9,678,056 B2 6/2017 Turner et al.
9,734,382 B2 8/2017 Wang et al.
9,738,929 B2 8/2017 Turner et al.
9,927,398 B2 3/2018 Reid et al.
10,036,065 B2 7/2018 Jones
10,215,768 B2 2/2019 Sanghera et al.
10,338,056 B2 7/2019 Hyde et al.
10,416,117 B2 9/2019 Reid et al.
10,549,274 B2 2/2020 Brown et al.
10,814,298 B2 10/2020 Hyde et al.
11,084,015 B2 8/2021 Hyde et al.
11,097,269 B2 8/2021 Goto et al.
11,561,216 B2 1/2023 Hyde et al.
11,596,940 B2 * 3/2023 Waterman ......... B01L 3/502738
11,789,006 B2 10/2023 Xie et al.
11,913,936 B2 2/2024 Hyde et al.
12,121,894 B2 10/2024 Waterman
12,140,563 B2 11/2024 Reid et al.
12,392,766 B2 8/2025 Xie et al.
12,411,125 B2 9/2025 Xie et al.
2002/0074227 A1 6/2002 Nisch et al.
2002/0123048 A1 9/2002 Gau
2002/0144905 A1 10/2002 Schmidt
2003/0015422 A1 1/2003 Fritsch et al.
2003/0075445 A1 4/2003 Woudenberg et al.
2003/0098248 A1 5/2003 Vogel et al.
2003/0111340 A1 6/2003 Cheng et al.
2003/0148401 A1 8/2003 Agrawal et al.
2003/0224523 A1 12/2003 Thornberg et al.
2004/0022677 A1 2/2004 Wohlstadter et al.
2004/0096358 A1 5/2004 Blankstein et al.
2004/0171169 A1 9/2004 Kallury et al.
2004/0197408 A1 10/2004 Gravett
2005/0014162 A1 1/2005 Barth et al.
2005/0133101 A1 6/2005 Chung et al.
2005/0230272 A1 10/2005 Lee et al.
2005/0279634 A1 12/2005 Ozaki et al.
2006/0079009 A1 4/2006 Salmon et al.
2006/0163063 A1 7/2006 Picollet-Dahan et al.
2006/0194331 A1 8/2006 Pamula et al.
2006/0257941 A1 11/2006 McDevitt et al.
2006/0257992 A1 11/2006 McDevitt et al.
2006/0292649 A1 12/2006 Cahill et al.
2007/0035308 A1 2/2007 Ide
2007/0161101 A1 7/2007 Takeuchi
2007/0275480 A1 11/2007 Brander et al.
2008/0254995 A1 10/2008 Kim et al.
2009/0072332 A1 3/2009 Dekker et al.
2009/0142504 A1 6/2009 Ervin et al.
2009/0167288 A1 7/2009 Reid et al.
2009/0185955 A1 7/2009 Nellissen
2010/0035349 A1 2/2010 Bau et al.
2010/0147450 A1 6/2010 Takeuchi et al.
2010/0188109 A1 7/2010 Edel et al.
2010/0190253 A1 7/2010 Tazaki et al.
2010/0196203 A1 8/2010 Sanghera et al.
2010/0264935 A1 10/2010 Erdman et al.
2010/0304980 A1 12/2010 Takeuchi et al.
2011/0043234 A1 2/2011 Lee et al.
2011/0120871 A1 5/2011 Reid et al.
2011/0121840 A1 5/2011 Sanghera et al.
2011/0133255 A1 6/2011 Merz
2011/0214991 A1 9/2011 Kim et al.
2011/0274737 A1 11/2011 Palmaz
2011/0287414 A1 11/2011 Chen et al.
2011/0318774 A1 12/2011 Larsen
2012/0010085 A1 1/2012 Rava et al.
2013/0048499 A1 2/2013 Mayer et al.
2013/0071932 A1 3/2013 Itchoda et al.
2013/0140192 A1 6/2013 Behrends et al.
2013/0196442 A1 8/2013 Momose et al.
2013/0207205 A1 8/2013 Chen
2013/0217106 A1 8/2013 Jones et al.
2013/0270521 A1 10/2013 Peng et al.
2013/0309776 A1 11/2013 Drndic et al.
2014/0010735 A1 1/2014 Tanaka et al.
2014/0190833 A1 7/2014 Lieber et al.
2014/0243214 A1 8/2014 Haga et al.
2014/0255921 A1 9/2014 Moysey et al.
2014/0296083 A1 10/2014 Brown et al.
2014/0318964 A1 10/2014 Dunbar et al.
2014/0329693 A1 11/2014 Reid et al.
2014/0335512 A1 11/2014 Moysey et al.
2014/0346059 A1 11/2014 Akeson
2014/0346515 A1 11/2014 Yanagi et al.
2014/0371568 A1 12/2014 Selby et al.
2015/0014160 A1 1/2015 Hyde et al.
2015/0027885 A1 1/2015 Rajaraman et al.
2015/0028846 A1 1/2015 Zhu
2015/0065354 A1 3/2015 Moysey et al.
2015/0151295 A1 * 6/2015 Kimura ............... B01L 3/50273
435/289.1
2015/0191709 A1 7/2015 Heron et al.
2015/0198611 A1 7/2015 Ostrowski et al.
2015/0204763 A1 7/2015 Stelzle et al.
2015/0218629 A1 8/2015 Heron et al.
2015/0232923 A1 8/2015 Drndic et al.
2015/0259724 A1 9/2015 Guan et al.
2015/0265994 A1 9/2015 Hyde et al.
2015/0268256 A1 9/2015 Sanghera et al.
2015/0300986 A1 10/2015 Reid et al.
2016/0040230 A1 2/2016 Akeson
2016/0178576 A1 6/2016 Maney et al.
2016/0231307 A1 8/2016 Xie
2016/0257942 A1 9/2016 Bruce et al.
2017/0189906 A1 7/2017 Moll et al.
2017/0326550 A1 11/2017 Brown et al.
2017/0363577 A1 12/2017 Reid et al.

(56) References Cited

U.S. PATENT DOCUMENTS

| | | | |
|---|---|---|---|
| 2018/0321188 | A1 | 11/2018 | Reid et al. |
| 2018/0372713 | A1 | 12/2018 | Stamm et al. |
| 2019/0210021 | A1 | 7/2019 | Waterman |
| 2019/0242913 | A1 | 8/2019 | Sanghera et al. |
| 2019/0352709 | A1 | 11/2019 | Clarke et al. |
| 2019/0391128 | A1 | 12/2019 | Hyde et al. |
| 2020/0292521 | A1 | 9/2020 | Xie et al. |
| 2021/0086160 | A1 | 3/2021 | Hyde et al. |
| 2021/0170403 | A1 | 6/2021 | Waterman |
| 2021/0300750 | A1 | 9/2021 | Waterman |
| 2022/0023819 | A1 | 1/2022 | Hyde et al. |
| 2023/0228733 | A1 | 7/2023 | Hyde et al. |
| 2023/0258592 | A1 | 8/2023 | Bedau |
| 2023/0349882 | A1 | 11/2023 | Xie et al. |
| 2024/0069007 | A1 | 2/2024 | Xie et al. |
| 2024/0369531 | A1 | 11/2024 | Hyde et al. |
| 2025/0033016 | A1 | 1/2025 | Hyde et al. |
| 2025/0073708 | A1 | 3/2025 | Waterman |
| 2025/0093296 | A1 | 3/2025 | Reid et al. |

FOREIGN PATENT DOCUMENTS

| | | | |
|---|---|---|---|
| CN | 1434461 | | 8/2003 |
| CN | 1500555 | A | 6/2004 |
| CN | 101078704 | | 11/2007 |
| CN | 100448007 | C | 12/2008 |
| CN | 101490277 | A | 7/2009 |
| CN | 100571871 | C | 12/2009 |
| CN | 102263104 | A | 11/2011 |
| CN | 203466320 | U | 9/2013 |
| CN | 103370617 | A | 10/2013 |
| CN | 103995035 | A | 8/2014 |
| CN | 205828393 | U | 12/2016 |
| CN | 106457247 | A | 2/2017 |
| DE | 102010022929 | A1 | 12/2011 |
| EP | 0532215 | A2 | 3/1993 |
| EP | 1110084 | A1 | 6/2001 |
| EP | 1120469 | A2 | 8/2001 |
| EP | 1419818 | A1 | 5/2004 |
| EP | 1535667 | A1 | 6/2005 |
| EP | 1669746 | A1 | 6/2006 |
| EP | 1677102 | | 7/2006 |
| EP | 1688742 | | 8/2006 |
| EP | 1710578 | | 10/2006 |
| EP | 1712909 | A1 | 10/2006 |
| EP | 1779921 | A1 | 5/2007 |
| EP | 2219032 | A1 | 8/2010 |
| GB | 2237390 | | 5/1991 |
| GB | 2446823 | | 8/2008 |
| JP | S5-274882 | A | 6/1977 |
| JP | 4014773 | A2 | 1/1992 |
| JP | 4127066 | B2 | 4/1992 |
| JP | H04-215052 | A | 8/1992 |
| JP | 7307172 | A2 | 11/1995 |
| JP | 2004-158330 | A2 | 6/2004 |
| JP | 2005-098718 | | 4/2005 |
| JP | 2005-164276 | A | 6/2005 |
| JP | 2005-300460 | A | 10/2005 |
| JP | 2005-539242 | A | 12/2005 |
| JP | 2006-312141 | A | 11/2006 |
| JP | 2008-194573 | A | 8/2008 |
| JP | 2009-128206 | A | 6/2009 |
| JP | 2010-186677 | A2 | 8/2010 |
| JP | 2012-247231 | A | 12/2012 |
| JP | 2013-148425 | A | 8/2013 |
| JP | 2013-242247 | A | 12/2013 |
| JP | 2014-190891 | A | 10/2014 |
| JP | 2014-529296 | A | 11/2014 |
| JP | 2015-064373 | A | 4/2015 |
| JP | 2018-510329 | A | 4/2018 |
| KR | 10-2017-0012367 | | 2/2017 |
| WO | WO 1988/008534 | A1 | 11/1988 |
| WO | WO 1994/025862 | A1 | 11/1994 |
| WO | WO 1997/016545 | A1 | 5/1997 |
| WO | WO 1998/058248 | | 12/1998 |
| WO | WO 1999/013101 | A1 | 3/1999 |
| WO | WO 2000/013014 | A1 | 3/2000 |
| WO | WO 2000/025121 | A1 | 5/2000 |
| WO | WO 2000/028312 | | 5/2000 |
| WO | WO 2001/059447 | A1 | 8/2001 |
| WO | WO 2002/024862 | A2 | 3/2002 |
| WO | WO 2002/029402 | A2 | 4/2002 |
| WO | WO 2002/035221 | A1 | 5/2002 |
| WO | WO 2002/082046 | A2 | 10/2002 |
| WO | WO 2003/052420 | A2 | 6/2003 |
| WO | WO 2005/040783 | A1 | 5/2005 |
| WO | WO 2005/124888 | A1 | 12/2005 |
| WO | WO 2006/012571 | A1 | 2/2006 |
| WO | WO 2006/076703 | A2 | 7/2006 |
| WO | WO 2006/100484 | | 9/2006 |
| WO | WO 2006/104639 | | 10/2006 |
| WO | WO 2006/113550 | | 10/2006 |
| WO | WO 2006/138160 | A2 | 12/2006 |
| WO | WO 2007/028003 | A2 | 3/2007 |
| WO | WO 2007/049576 | A1 | 5/2007 |
| WO | WO 2007/116978 | A1 | 10/2007 |
| WO | WO 2007/127327 | | 11/2007 |
| WO | WO 2007/132002 | A1 | 11/2007 |
| WO | WO 2008/012552 | A1 | 1/2008 |
| WO | WO 2008/054611 | A2 | 5/2008 |
| WO | WO 2008/102120 | | 8/2008 |
| WO | WO 2008/102121 | | 8/2008 |
| WO | WO 2008/124107 | A1 | 10/2008 |
| WO | WO 2008/137008 | A2 | 11/2008 |
| WO | WO 2008/156041 | A1 | 12/2008 |
| WO | WO 2009/024775 | A1 | 2/2009 |
| WO | WO 2009/035647 | A1 | 3/2009 |
| WO | WO 2009/077734 | A2 | 6/2009 |
| WO | WO 2010/086603 | A1 | 8/2010 |
| WO | WO 2010/122293 | | 10/2010 |
| WO | WO 2010/142954 | A1 | 12/2010 |
| WO | WO 2011/046706 | A1 | 4/2011 |
| WO | WO 2011/067559 | A1 | 6/2011 |
| WO | WO 2011/118211 | A1 | 9/2011 |
| WO | WO 2011/154114 | A2 | 12/2011 |
| WO | WO 2012/033524 | A2 | 3/2012 |
| WO | WO 2012/042226 | A2 | 4/2012 |
| WO | WO 2012/107778 | A2 | 8/2012 |
| WO | WO 2013/012881 | A2 | 1/2013 |
| WO | WO 2013/021815 | A1 | 2/2013 |
| WO | WO 2012/138357 | A1 | 3/2013 |
| WO | WO 2013/041878 | A1 | 3/2013 |
| WO | WO 2013/057495 | A2 | 4/2013 |
| WO | WO 2013/121193 | A2 | 8/2013 |
| WO | WO 2013/121224 | A1 | 8/2013 |
| WO | WO 2013/123379 | A2 | 8/2013 |
| WO | WO 2013/153359 | A1 | 10/2013 |
| WO | WO 2014/013260 | A1 | 1/2014 |
| WO | WO 2014/019603 | A1 | 2/2014 |
| WO | WO 2014/064443 | A2 | 5/2014 |
| WO | WO 2014/064444 | A1 | 5/2014 |
| WO | WO 2014/132343 | A1 | 9/2014 |
| WO | WO 2014/158665 | A1 | 10/2014 |
| WO | WO 2015/183871 | A1 | 12/2015 |
| WO | WO 2015/193076 | A1 | 12/2015 |
| WO | WO 2016/034591 | A2 | 3/2016 |
| WO | WO 2016/059427 | A1 | 4/2016 |
| WO | WO 2016/127007 | A2 | 8/2016 |
| WO | WO 2016/172724 | A1 | 10/2016 |
| WO | WO 2016/187519 | A1 | 11/2016 |
| WO | WO 2017/061600 | A1 | 4/2017 |
| WO | WO 2018/007819 | A1 | 1/2018 |
| WO | WO 2019/063959 | A1 | 4/2019 |
| WO | WO 2019/160925 | A1 | 8/2019 |
| WO | WO 2020/183172 | A1 | 9/2020 |

OTHER PUBLICATIONS

U.S. Appl. No. 17/665,011, filed Feb. 4, 2022, Brown et al.
U.S. Appl. No. 17/665,035, filed Feb. 4, 2022, Brown et al.
U.S. Appl. No. 18/016,012, filed Jan. 13, 2023, Xie et al.
PCT/GB2017/051991, Oct. 11, 2017, International Search Report and Written Opinion.

(56) References Cited

OTHER PUBLICATIONS

PCT/GB2017/051991, Jan. 17, 2019, International Preliminary Report on Patentability.
Third Party Observations for EP 17739663.7, mailed Sep. 23, 2021. 18 pages.
[No Author Listed] Avanti Polar Lipids, Inc. Avanti Polar Lipids-Preparations of Liposomes. Www.avantilipids.com 5 pages. Jul. 1, 2014.
Aghdaei et al., Formation of artificial lipid bilayers using droplet dielectrophoresis. Lab Chip. Oct. 2008;8(10):1617-20. doi: 10.1039/b807374k. Epub Aug. 13, 2008.
Anrather et al., Supported membrane nanodevices. J Nanosci Nanotechnol. Jan.-Feb. 2004;4(1-2):1-22.
Astier et al., Toward single molecule DNA sequencing: direct identification of ribonucleoside and deoxyribonucleoside 5'-monophosphates by using an engineered protein nanopore equipped with a molecular adapter. J Am Chem Soc. Feb. 8, 2006;128(5):1705-10.
Baaken et al., Planar microelectrode-cavity array for high-resolution and parallel electrical recording of membrane ionic currents. Lab Chip. Jun. 2008;8(6):938-44. doi: 10.1039/b800431e. Epub Apr. 16, 2008.
Bezrukov et al., Counting polymers moving through a single ion channel. Nature. Jul. 28, 1994;370(6487):279-81.
Bouaidat et al., Surface-directed capillary system; theory, experiments and applications. Lab Chip. Aug. 2005;5(8):827-36. Epub Jul. 1, 2005.
Bruggemann et al., Microchip technology for automated and parallel patch-clamp recording. Small. Jul. 2006;2(7):840-6.
Bull et al., Polymer Films on Electrodes. J. Electrochem Soc. May 1982;129(5):1009-1015.
Cheng et al., Discrete membrane arrays. J Biotechnol. Sep. 2000;74(3):159-74.
Cheng et al., Single Ion Channel Sensitivity in Suspended Bilayers on Micromachined Supports. Langmuir. 2001;17(4):1240-1242.
Danelon et al., Cell membranes suspended across nanoaperture arrays. Langmuir. Jan. 3, 2006;22(1):22-5.
Estes et al., Electroformation of giant liposomes from spin-coated films of lipids. Colloids Surf B Biointerfaces. May 10, 2005;42(2):115-23.
Fraikin et al., A high-throughput label-free nanoparticle analyser. Nat Nanotechnol. 2011;6(5):308-313. doi:10.1038/nnano.2011.24.
Funakoshi et al., Lipid bilayer formation by contacting monolayers in a microfluidic device for membrane protein analysis. Anal Chem. Dec. 15, 2006;78(24):8169-74.
Garstecki et al., Formation of droplets and bubbles in a microfluidic T-junction-scaling and mechanism of break-up. Lab Chip. Mar. 2006;6(3):437-46. Epub Jan. 25, 2006. Erratum in: Lab Chip. May 2006;6(5):693.
Gonzalez-Perez et al., Biomimetic triblock copolymer membrane arrays: a stable template for functional membrane proteins. Langmuir. 2009;25(18):10447-10450. doi:10.1021/la902417m.
Hasanzadeh et al., Room-temperature ionic liquid-based electrochemical nanobiosensors. Trends Anal Chem. Dec. 2012;41:58-74.
Heron et al., Simultaneous measurement of ionic current and fluorescence from single protein pores. J Am Chem Soc. Feb. 11, 2009;131(5):1652-3. doi: 10.1021/ja808128s.
Hirano et al., Lipid Bilayers at Gel/Gel Interface for Ion Channel Recordings. Surf. Sci. Nanotech. 2008;6:130-133.
Holden et al., Functional bionetworks from nanoliter water droplets. J Am Chem Soc. Jul. 11, 2007;129(27):8650-5. Epub Jun. 16, 2007.
Horn, Avoiding Evaporation. Ibidi. Application Note 12. Mar. 29, 2012, pp. 1-3.
Hovis et al., Patterning and Composition Arrays of Supported Lipid Bilayers by Microcontact Printing. Langmuir. 2001;17:3400-3405.
Hromada et al., Single molecule measurements within individual membrane-bound ion channels using a polymer-based bilayer lipid membrane chip. Lab Chip. Apr. 2008;8(4):602-8. doi:10.1039/b716388f. Epub Feb. 29, 2008.
Ide et al., A novel method for artificial lipid-bilayer formation. Biosens Bioelectron. Oct. 15, 2005;21(4):672-7. Epub Jan. 26, 2005.
Ikariyama et al., Polypyrrole electrode as a detector for electroinactive anions by flow injection analysis. Anal. Chem. 1986, 58, 8, 1803-1806.
Ivanov et al., DNA tunneling detector embedded in a nanopore. Nano Lett. 2011;11(1):279-285. doi:10.1021/nl103873a.
Jeon et al., Long-term storable and shippable lipid bilayer membrane platform. Lab Chip. Oct. 2008;8(10):1742-4. doi: 10.1039/b807932c. Epub Aug. 22, 2008.
Jung et al., Detecting protein-ligand binding on supported bilayers by local pH modulation. J Am Chem Soc. Jan. 28, 2009;131(3):1006-14. doi: 10.1021/ja804542p. Author Manuscript, 23 pages.
Kam et al., Spatially Selective Manipulation of Supported Lipid Bilayers by Laminar Flow: Steps Toward Biomembrane Microfluidic. Langmuir. 2003;19(5):1624-1631.
Kasianowicz et al., Protonation dynamics of the alpha-toxin ion channel from spectral analysis of pH-dependent current fluctuations. Biophys J. Jul. 1995;69(1):94-105.
Khafizov, Single Molecule Force Spectroscopy Of Single Stranded Dna Binding Protein And Rep Helicase. University of Illinois at Urbana-Champaign Dissertation. 2012.
Kim et al., Liquid-slate field-effect transistors using electrowetting. Applied Physics Letters. 90:043507-1-043507-3.
Korolev et al., Major domain swiveling revealed by the crystal structures of complexes of *E. coli* Rep helicase bound to single-stranded DNA and ADP. Cell. Aug. 22, 1997;90(4):635-47.
Krantz Lab. Planar Lip Bilayer Electrophysiology Equipment. Department of Molecular & Cell Biology, University of California, Berkeley. Oct. 6, 2007. Last accessed at mcb.berkeley.edu/labs/krantz/equipment/blm.html on Nov. 26, 2014.
Kung et al., Printing via Photolithography on Micropartitioned Fluid Lipid Membranes. Adv. Materials. 2000;12(10):731-734.
Langecker et al., Synthetic lipid membrane channels formed by designed DNA nanostructures. Science. Nov. 16, 2012;338(6109):932-6. doi: 10.1126/science.1225624.
Le Pioufle et al., Lipid bilayer microarray for parallel recording of transmembrane ion currents. Anal Chem. Jan. 1, 2008;80(1):328-32. Epub Nov. 15, 2007.
Lee et al., Ion channel switch array: A biosensor for detecting multiple pathogens. Industrial Biotechnology. May 2005;1(1):26-31. doi:10.1089/ind.2005.1.26.
Lee et al., Nanoarrays of tethered lipid bilayer rafts on poly(vinyl alcohol) hydrogels. Lab Chip. Jan. 7, 2009;9(1):132-9. doi: 10.1039/b809732a. Epub Oct. 22, 2008.
Lee et al., Polyelectrolyte Micropatterning Using Agarose Plane Stamp and a Substrate Having Microscale Features on Its Surface. Bull. Korean Chem. Soc., vol. 26(10):1539-1542 (2005).
Lewis et al., The Mesomorphic Phase Behavior of Lipid Bilayers. Structure Biological Membranes. 3rd Ed. Ed: Yeagle. CRC Press 2011. 19-89.
Li et al., Microfluidic system for planar patch clamp electrode arrays. Nano Lett. Apr. 2006;6(4):815-9.
Lieberman et al., Processive replication of single DNA molecules in a nanopore catalyzed by phi29 DNA polymerase. J Am Chem Soc. Dec. 22, 2010;132(50):17961-72. doi:10.1021/ja1087612. Epub Dec. 1, 2010.
Luan et al., Base-by-base ratcheting of single stranded DNA through a solid-state nanopore. Phys Rev Lett. Jun. 11, 2010;104(23):238103. Epub Jun. 10, 2010.
Mach et al., Miniaturized planar lipid bilayer: increased stability, low electric noise and fast fluid perfusion. Anal Bioanal Chem. Feb. 2008;390(3):841-6. Epub Oct. 31, 2007.
Majd et al., Hydrogel stamping of arrays of supported lipid bilayers with various lipid compositions for the screening of drug-membrane and protein-membrane interactions. Angew Chem Int Ed Engl. Oct. 21, 2005;44(41):6697-700.
Malmstadt et al., Automated formation of lipid-bilayer membranes in a microfluidic device. Nano Lett. Sep. 2006;6(9):1961-5.
Mangold et al., Reference electrodes based on conducting polymers. Fresenius J Anal Chem. Jun. 2000;367(4):340-2.

(56) References Cited

OTHER PUBLICATIONS

Mastrangeli et al., Challenges for Capillary Self-Assembly of Microsystems. IEEE Transactions. Jan. 2011;1(1):133-149.
Mastrangeli et al., Self-assembly from milli- to nanoscales: methods and applications. J Micro Microeng. 2009;19:083001.
Maurer et al., Reconstitution of ion channels in agarose-supported silicon orifices. Biosens Bioelectron. May 15, 2007;22(11):2577-84. Epub Nov. 13, 2006.
McAlduff et al., Freestanding lipid bilayers as substrates for electron cryomicroscopy of integral membrane proteins. J Microsc. Feb. 2002;205(Pt 2):113-7.
Montal et al., Formation of bimolecular membranes from lipid monolayers and a study of their electrical properties. Proc Natl Acad Sci U S A. Dec. 1972;69(12):3561-6.
Moran-Mirabal et al., Micrometer-sized supported lipid bilayer arrays for bacterial toxin binding studies through total internal reflection fluorescence microscopy. Biophys J. Jul. 2005;89(1):296-305. Epub Apr. 15, 2005.
Ogier et al., Suspended Planar Phospholipid Bilayers on Micromachined Supports, Langmuir, vol. 16:5696-5701 (2000).
Onoe et al., Three-Dimensional Micro-Self-Assembly Using Hydrophobic Interaction Controlled by Self-Assembled Monolayers. J Micro Systems. Aug. 2004;13(4):603-611.
Parthasarathy et al., Protein patterns at lipid bilayer junctions. Proc Natl Acad Sci U S A. Aug. 31, 2004;101(35):12798-803. Epub Aug. 20, 2004.
Peterman et al., Ion Channels and Lipid Bilayer Membranes Under High Potentials Using Microfabricated Apertures. Biomedical Microdevices, vol. 4(3):231-236 (2002).
Polk et al., Ag/AgC1 microelectrodes with improved stability for microfluidics, Sensors and Actuators B., vol. 114:239-247 (2006).
Rauf et al., Studies on sildenafil citrate (Viagra) interaction with DNA using electrochemical DNA biosensor. Biosens Bioelectron. May 15, 2007;22(11):2471-7. Epub Nov. 7, 2006.
Romer et al., Impedance analysis and single-channel recordings on nano-black lipid membranes based on porous alumina. Biophys J. Feb. 2004;86(2):955-65.
Sackmann, Supported membranes: scientific and practical applications. Science. Jan. 5, 1996;271(5245):43-8.
Sandison et al., Air-exposure technique for the formation of artificial lipid bilayers in microsystems. Langmuir. Jul. 17, 2007;23(15):8277-84. Epub Jun. 22, 2007.
Sandison et al., Rapid fabrication of polymer microfluidic systems for the production of artificial lipid bilayers. J. Micromech. Microeng., vol. 15:S139-S144 (2005).
Sapra et al., Lipid-coated hydrogel shapes as components of electrical circuits and mechanical devices. Sci Rep. 2012;2:848. doi: 10.1038/srep00848. Epub Nov. 14, 2012.
Sarles et al., Bilayer formation between lipid-encased hydrogels contained in solid substrates. ACS Appl Mater Interfaces. Dec. 2010;2(12):3654-63. doi: 10.1021/am100826s. Epub Nov. 10, 2010.
Schindler et al., Branched bimolecular lipid membranes. Biophys J. Sep. 1976; 16(9):1109-13.
Schmidt et al., A Chip-Based Biosensor for the Functional Analysis of Single Ion Channels. Angew Chem Int Ed Engl. Sep. 1, 2000;39(17):3137-3140.
Shim et al., Stochastic sensing on a modular chip containing a single-ion channel. Anal Chem. Mar. 15, 2007;79(6):2207-13. Epub Feb. 9, 2007. Author Manuscript, 13 pages.
Smith et al., Micropatterned fluid lipid bilayer arrays created using a continuous flow microspotter. Anal Chem. Nov. 1, 2008;80(21):7980-7. doi: 10.1021/ac800860u. Epub Oct. 8, 2008. Author Manuscript, 17 pages.
Soni et al., Synchronous optical and electrical detection of biomolecules traversing through solid-state nanopores. Rev Sci Instrum. Jan. 2010;81(1):014301. doi: 10.1063/1.3277116.
Stoddart et al., Single-nucleotide discrimination in immobilized DNA oligonucleotides with a biological nanopore. Proc Natl Acad Sci U S A. May 12, 2009;106(19):7702-7. doi: 10.1073/pnas.0901054106. Epub Apr. 20, 2009.
Sun et al., Microfluidic static droplet arrays with tuneable gradients in material composition. Lab Chip. Dec. 7, 2011;11(23):3949-52. doi: 10.1039/c1lc20709a. Epub Oct. 12, 2011.
Suzuki et al., Highly reproducible method of planar lipid bilayer reconstitution in polymethyl methacrylate microfluidic chip. Langmuir. Feb. 14, 2006;22(4):1937-42.
Suzuki et al., Planar lipid bilayer reconstitution with a micro-fluidic system. Lab Chip. Oct. 2004;4(5):502-5. Epub Sep. 2, 2004.
Suzuki et al., Planar Lipid Membrane Array for Membrane Protein Chip. 17th IEEE International Conference on Micro Electro Mechanical Systems (MEMS), pp. 272-275 (2004).
Syms et al., Surface Tension-Powered Self-Assembly of Microstructures—The State of the Art. J Micro Systems. Aug. 2003;12(4):387-417.
Thorsen et al., Dynamic pattern formation in a vesicle-generating microfluidic device. Phys Rev Lett. Apr. 30, 2001;86(18):4163-6.
Urisu et al., Formation of high-resistance supported lipid bilayer on the surface of a silicon substrate with microelectrodes. Nanomedicine. Dec. 2005;1(4):317-22.
Vidinha et al., Ion jelly: a tailor-made conducting material for smart electrochemical devices. Chem Commun (Camb). Nov. 30, 2008;(44):5842-4. doi: 10.1039/b811647d. Epub Oct. 3, 2008.
Vulto et al., Microfluidic channel fabrication in dry film resist for production and prototyping of hybrid chips. Lab Chip. Feb. 2005;5(2):158-62. Epub Dec. 3, 2004.
Watanabe et al., Electrical recording of Nanopore membrane proteins in a microfluidic device. The Papers of Technical Meeting on Bio Micro Systems, IEE Japa. 2010; BMS-10(7-27):5-8.
Yusko et al., Controlling protein translocation through nanopores with bio-inspired fluid walls. Nat Nanotechnol. Apr. 2011; 6(4): 253-260. Epub Feb. 20, 2011. doi: 10.1038/nnano.2011.12. Author Manuscript, 22 pages.
Zagnoni et al., Bilayer lipid membranes from falling droplets. Anal Bioanal Chem. Mar. 2009;393(6-7):1601-5. doi:10.1007/s00216-008-2588-5. Epub Jan. 19, 2009.
Zagnoni et al., Controlled delivery of proteins into bilayer lipid membranes on chip. Lab Chip. Sep. 2007;7(9):1176-83. Epub Jun. 27, 2007. Author Manuscript, 14 pages.
Zagnoni et al., Microfluidic array platform for simultaneous lipid bilayer membrane formation. Biosens Bioelectron. Jan. 1, 2009;24(5):1235-40. doi: 10.1016/j.bios.2008.07.022. Epub Jul. 23, 2008.
Third Party Observations for Application No. EP21749248.7, mailed Jul. 12, 2023.
Piper et al., Stable silicon-ionic liquid interface for next-generation lithium-ion batteries. Nat Commun. Feb. 25, 2015;6:6230. 10 pages. doi: 10.1038/ncomms7230.
Tomimatsu et al. Possible contamination of ionic liquids upon dissolution and absorption of rubber and resin components, Journal of Molecular Liquids. Mar. 15, 2019;278:78-85.

* cited by examiner

MICROFLUIDIC DEVICE

RELATED APPLICATIONS

This Application is a Continuation of U.S. application Ser. No. 16/315,602, filed Jan. 4, 2019, entitled "MICROFLUIDIC DEVICE", which is a national stage filing under 35 U.S.C. § 371 of international application number PCT/GB2017/051991, filed Jul. 6, 2017, which claims the benefit of GB application number 1611770.7, filed Jul. 6, 2016, each of which is herein incorporated by reference in its entirety.

FIELD OF THE DISCLOSURE

The present invention relates to a microfluidic device, in particular a device comprising a sensor for sensing in wet conditions.

BACKGROUND

A variety of microfluidic devices and sensors are known. Sensors such as disclosed by WO99/13101 and WO88/08534 are provided in the dry state and a liquid test sample applied to the device is transported to the sensor region within the device by capillary flow. Other types of sensors are known, such as ion selective sensors comprising an ion selective membrane.

Another example is provided by WO 2009/077734 which discloses an apparatus for creating layers of amphiphilic molecules, and is now briefly discussed with reference to FIG. 1.

FIG. 1 shows an apparatus 1 which may be used to form a layer of amphiphilic molecules. The apparatus 1 includes a body 2 having layered construction comprising a substrate 3 of non-conductive material supporting a further layer 4 also of non-conductive material. A recess 5 is formed in the further layer 4, in particular as an aperture which extends through the further layer 4 to the substrate 3. The apparatus 1 further includes a cover 6 which extends over the body 2. The cover 6 is hollow and defines a chamber 7 which is closed except for an inlet 8 and an outlet 9 each formed by openings through the cover 6. The lowermost wall of the chamber 7 is formed by the further layer 4.

In use aqueous solution 10 is introduced into the chamber 7 and a layer 11 of amphiphilic molecules is formed across the recess 5 separating aqueous solution 10 in the recess 5 from the remaining volume of aqueous solution in the chamber 7. Use of a chamber 7 which is closed makes it very easy to flow aqueous solution 10 into and out of the chamber 7. This is done simply by flowing the aqueous solution 10 through the inlet 8 as shown in FIG. 1 until the chamber 7 is full. During this process, gas (typically air) in the chamber 7 is displaced by the aqueous solution 10 and vented through the outlet 9.

The apparatus includes an electrode arrangement to allow measurement of electrical signals across the layer 11 of amphiphilic molecules, which allows the device to function as a sensor. The substrate 3 has a first conductive layer 20 deposited on the upper surface of the substrate 3 and extending under the further layer 4 to the recess 5. The portion of the first conductive layer 20 underneath the recess 5 constitutes an electrode 21 which also forms the lowermost surface of the recess 5. The first conductive layer 20 extends outside the further layer 4 so that a portion of the first conductive layer 20 is exposed and constitutes a contact 22.

The further layer 4 has a second conductive layer 23 deposited thereon and extending under the cover 6 into the chamber 7, the portion of the second conductive layer 23 inside the chamber 7 constituting an electrode 24. The second conductive layer 23 extends outside the cover 6 so that a portion of the second conductive layer 23 is exposed and constitutes a contact 25. The electrodes 21 and 24 make electrical contact with aqueous solution in the recess 5 and chamber 7. This allows measurement of electrical signals across the layer 11 of amphiphilic molecules by connection of an electrical circuit to the contacts 22 and 25.

In practice, the device of FIG. 1 can have an array of many such recesses 5. Each recess is provided with the layer 11 of amphiphilic molecules. Further, each layer can be provided with a nanopore, to allow other molecules to pass through the layer (which affects the electrical signal measured). For example, one nanopore is provided per membrane. The extent to which this occurs is determined in part upon the concentration of the nanopores in the medium applied to the membranes.

An analysis apparatus incorporating means to provide amphiphilic membranes and nanopores to the sensor is disclosed by WO2012/042226. The step of providing the amphiphilic membranes and nanopores is carried out prior to use of the device, typically by the end user. However this provides drawbacks in that additional steps are required on the part of the consumer and also requires the provision of an apparatus with a complex fluidic arrangement including valves and supply reservoirs. Furthermore setting up such a sensor for use by the user can be prone to error. There is a risk that, even if the system is set up correctly, it will dry out, which could potentially damage the sensor. There is also a risk that excessive flowrates in the sample chamber could cause damage to the sensor. This risk increases for more compact devices, which bring the sample input port into closer proximity to the sensor (and so there is less opportunity for system losses to reduce the flowrates through the device).

It is therefore desirable to provide a device to the user in a 'ready to use' state wherein the amphiphilic membranes and nanopores are pre-inserted and are maintained under wet conditions. More generally it is also desirable to provide a device wherein the sensor is provided in a wet condition, for example provided in a wet condition to or by the user prior to detection of an analyte.

SUMMARY

A typical nanopore device provided in a 'ready to use' state comprises an array of amphiphilic membranes, each membrane comprising a nanopore and being provided across a well containing a liquid. Such a device and method of making is disclosed by WO2014/064443. Test liquid to be analysed is applied to the upper surface of the amphiphilic membranes. Providing a device in a 'ready to use' state however has additional considerations in that care needs to be taken that the sensor does not dry out, namely that liquid is not lost from the well by passage through the amphiphilic membrane, which may result in a loss of performance or damage the sensor. One solution to address the problem of drying out of the sensor is to provide the device with a buffer liquid over the surface of the amphiphilic membrane such that any evaporation through the surface of the membrane is minimised and the liquids provided on either side of the membrane may have the same ionic strength so as to reduce any osmotic effects. In use the buffer liquid may be removed from the surface of the amphiphilic membrane and a test liquid to be analysed is introduced to contact the surface. When the device contains a buffer liquid, the questions of how to remove it and how to introduce the test liquid become an issue. Due to the presence of the buffer liquid, namely that the sensor is provided in a 'wet state', the capillary force provided by a dry capillary channel cannot be utilised to draw test liquid into the sensor. A pump may be used to displace the buffer liquid and to introduce a test liquid, however this results in a device with added complexity and cost.

An ion selective electrode device comprising one or more ion selective membranes is typically calibrated prior to use with a solution having a known ionic concentration. The ion selective membranes may be provided in a capillary flow path connecting a fluid entry port through which a calibrant solution may be introduced and caused to flow over the ion selective electrodes by capillary action. Thereafter the calibrant solution may be displaced and the analyte solution caused to flow over the electrodes in order to perform the measurement. In large benchtop devices for the measurement of ions, a peristaltic pump may for example be employed to displace the liquid. However for simple disposable devices, a less complex solution is more desirable.

In other devices, a pair of electrodes may be provided in a capillary channel into which a first test liquid is drawn by capillary action in order to make an electrochemical analysis. Following measurement of the first test liquid, it may be desirable to measure a second test liquid. However an additional force intervention is needed in order to remove the first test liquid prior to introduction of the second test liquid as capillary force is longer available.

The present invention aims to at least partly reduce or overcome the problems discussed above.

According to an aspect of the invention, there is provided a microfluidic device for analysing a test liquid comprising at least one of the following features: a sensor provided in a sensing chamber; a flow path comprising a sensing chamber inlet and a sensing chamber outlet connecting to the sensing chamber for respectively passing liquid into and out of the sensing chamber, and a sample input port in fluid communication with the inlet; a liquid collection channel downstream of the outlet; a flow path interruption between the sensing chamber outlet and the liquid collection channel, preventing liquid from flowing into the liquid collection channel from upstream, whereby the device may be activated by completing the flow path between the sample input port and the liquid collection channel; a conditioning liquid filling from the sample input port to the flow path interruption such that the sensor is covered by liquid and unexposed to a gas or gas/liquid interface; wherein the device is configured such that following activation of the device, the sensor remains unexposed to a gas or gas/liquid interface and the application of respectively one or more volumes of test liquid to a wet surface of the input port provides a net driving force sufficient to introduce the one or more volumes of test liquid into the device and displace buffer liquid into the liquid collection channel.

According to a first aspect of the invention there is provided a fluidic device (e.g., a microfluidic device) comprising one or more of the following elements: a sensor provided in a sensing chamber; a liquid inlet and liquid outlet connecting to the sensor chamber for respectively passing liquid into and out of the sensing chamber and; a sample input port in fluid communication with the liquid inlet; a liquid collection channel downstream of the sensing chamber outlet; a flow path interruption between the liquid outlet and the liquid collection channel, preventing liquid from flowing into the liquid collection channel from upstream; a buffer liquid filling from the sample input port to the sensing chamber, and filling the sensing chamber and filling from the liquid outlet to the flow path interruption; an activation system operable to complete the flow path between the liquid outlet and the liquid collection channel such that the sensor remains unexposed to gas or a gas/liquid interface. That is, the liquid over the sensor is neither totally nor partially displaced by gas (there may be dissolved gas or microbubbles that may be present in the liquid, but the presence of these is not intended to be excluded by the phrase 'unexposed to gas or gas/liquid interface').

In some embodiments, a device provided herein is configured to avoid free draining of the sensing chamber when a flow path is completed.

In some embodiments, the device is an electrochemical device for the detection of an analyte and the sensor comprises electrodes.

In some embodiments the electrodes may be ion selective.

In some embodiments, a sample input port, a sensing chamber inlet and a liquid collection channel are configured to avoid free draining of a sensing chamber when a flow path is completed and further wherein a input port is configured such that it presents a wet surface to a test liquid to be applied to the device.

In some embodiments, a device provided herein is configured such that following completion of a flow path and prior to addition of a volume of test sample to a sample input port, a pressure at the input port is equal to a pressure at the liquid collection channel, such that the liquid is at equilibrium.

In some embodiments, a sample input port is configured such that addition of a volume of test liquid to said port provides a net driving force sufficient to introduce the one or more volumes of test liquid into the device and displace buffer liquid into the collection channel.

In some embodiments, a sample input port, a sensing chamber inlet and a liquid collection channel are configured such that, when an activation system has been operated to complete the flow path, a sensor remains unexposed to gas or a gas/liquid interface whilst the device is tilted.

In some embodiments, a sensing chamber inlet and a liquid collection channel are configured to balance capillary pressures and flow resistances to avoid free draining of a sensing chamber when a flow path is completed.

In some embodiments, a device provided herein further comprises a weir past which fluid may be displaced by provision of a liquid to a sample input port, but which prevents draining of a sample chamber.

In some embodiments, a device provided herein further comprises a priming reservoir filled with fluid. A fluid may be introduced into a flow path, for example for making fine adjustments to a volume of liquid in the flow path. An activation system may be operable to introduce fluid from the priming reservoir to complete the flow path between a liquid outlet and a liquid collection channel.

In some embodiments, a device provided herein further comprises a removable seal for a sample input port.

In some embodiments, a sample input port and a seal are configured such that the removal of the seal provides a priming action to maintain a buffer liquid in the input port and present a wet surface to a test liquid to be applied.

In some embodiments, a priming action draws fluid from the liquid collection channel or a priming reservoir.

In some embodiments, a flow path interruption comprises a closed valve; and an activation system comprises a mechanism for opening the valve. The valve may be a hydrophobic valve.

In some embodiments, a flow path interruption comprises a flow obstacle; and n activation system comprises a mechanism for removing the flow obstacle or forcing liquid past the flow obstacle.

In some embodiments, a sensor can contain a single well. Alternatively, a sensor can comprise an array of wells, wherein each well comprises a liquid and wherein a membrane is provided across the surface of each well separating the liquid contained in the well from the buffer liquid.

In some embodiments, each membrane further comprises a nanopore.

In some embodiments, a membrane is ion selective.

In some embodiments, a membrane is amphiphilic.

In some embodiments, a nanopore is a biological nanopore.

According to another aspect of the invention there is provided a method of filling the microfluidic device according to any one of the preceding embodiments, with test liquid, the method comprising one or more of the following steps: operating the activation system to complete the flow path; introducing test liquid into the device via the sample input port so as to displace buffer liquid from the sensing chamber into the liquid collection channel whilst; ceasing to introduce test liquid such that the sensor remains unexposed to gas or a gas/liquid interface.

In some embodiments, a device further comprises a removable seal for a sample input port and the method further comprises: removing the removable seal and priming the sample input port so that the input port is filled with buffer liquid before the step of introducing the test liquid.

In some embodiments, a step of priming comprises flushing a device by providing additional buffer liquid to the device through a sample input port.

In some embodiments, a step of priming comprises drawing fluid from inside a device into a sample input port.

In some embodiments, a plurality of discrete volumes of test liquid are successively applied to a sample input port in order to successively displace buffer liquid into the liquid collection channel.

According to one embodiment there is provided a microfluidic device for analysing a test liquid comprising one or more of the following features: a sensor provided in a sensing chamber; a flow path comprising a liquid inlet and a liquid outlet connecting to the sensing chamber for respectively passing liquid into and out of the sensing chamber, and a sample input port in fluid communication with the inlet; a liquid collection channel downstream of the outlet; a flow path interruption structure positioned between the sensing chamber outlet and the liquid collection channel, wherein the flow path interruption structure is configured to be operable in a first state to prevent upstream liquid from flowing into the liquid collection channel, or in a second state to complete the flow path between the sample input port and the liquid collection channel; a conditioning liquid contained in a flow path connecting from the sample input port to the flow path interruption such that the sensor is covered by liquid and unexposed to a gas or gas/liquid interface; wherein the dimensions of the sample input port and liquid collection channel are configured such that following activation of the device (i.e. changing from the first state to the second state), the sensor remains unexposed to a gas or gas/liquid interface and the application of respectively one or more volumes of test liquid to a wet surface of the input port provides a net driving force sufficient to introduce the one or more volumes of test liquid into the device and displace buffer liquid into the liquid collection channel.

According to one embodiment there is provided a microfluidic device for analysing a test liquid comprising one or more of the following features: a sensor provided in a sensing chamber; a flow path comprising a liquid inlet and a liquid outlet connecting to the sensing chamber for respectively passing liquid into and out of the sensing chamber, and a sample input port in fluid communication with the inlet; a liquid collection channel downstream of the outlet; a flow path interruption structure positioned between the sensing chamber outlet and the liquid collection channel, wherein the flow path interruption structure is configured to prevent upstream liquid from flowing into the liquid collection channel, a conditioning liquid contained in a flow path connecting from the sample input port to the flow path interruption such that the sensor is covered by liquid and unexposed to a gas or gas/liquid interface.

According to one embodiment there is provided a microfluidic device for analysing a test liquid comprising one or more of the following features: a sensor provided in a sensing chamber; a flow path comprising a liquid inlet and a liquid outlet connecting to the sensing chamber for respectively passing liquid into and out of the sensing chamber, and a sample input port in fluid communication with the inlet; a liquid collection channel downstream of the outlet; a flow path interruption structure positioned between the sensing chamber outlet and the liquid collection channel, wherein the flow path interruption structure is configured to complete the flow path between the sample input port and the liquid collection channel; a conditioning liquid contained in a flow path connecting from the sample input port to the flow path interruption such that the sensor is covered by liquid and unexposed to a gas or gas/liquid interface; wherein the dimensions of the sample input port and liquid collection channel are configured such that the sensor remains unexposed to a gas or gas/liquid interface and the application of respectively one or more volumes of test liquid to a wet surface of the input port provides a net driving force sufficient to introduce the one or more volumes of test liquid into the device and displace buffer liquid into the liquid collection channel.

BRIEF DESCRIPTION OF THE DRAWINGS

The invention is described below with reference to exemplary Figures, in which.

DETAILED DESCRIPTION OF EXEMPLARY EMBODIMENTS

The present disclosure allows for a microfluidic device, using a "wet-sensor" (i.e. a sensor that functions in a wet environment) to be produced and stored in a state in which the sensor is kept wet, until it is needed. This is effectively achieved by providing a device that has an "inactive" state in which the sensor is kept wet, but in which the device cannot be used, and an "active" state in which the device can be used. In other words, an "inactive" state can be a state in which a flow path between a sample input port and a liquid collection channel is not complete, as discussed below. In contrast an "active" state, can be a state in which the flow path between a sample input port and a liquid collection channel is complete. A particular benefit of keeping the sensor wet when considering nanopore sensors (see more detail below) is to ensure that well liquid does not escape through the membrane. The membrane is very thin and the sensor is very sensitive to moisture loss. Moisture loss can create for example a resistive air gap between the well liquid and the membrane thus breaking the electrical circuit between an electrode provided in the well and in the sample. Moisture loss can also serve to increase the ionic strength of the well liquid, which could affect the potential difference across the nanopore. The potential difference has an effect on the measured signal and thus any change would have an effect on the measurement values.

In any case the device of the invention can be maintained in the "inactive" state for a long period of time until it is required. During that time, for example, the device could be transported (e.g. shipped from a supplier to an end user), as the "inactive" state is robust and capable of maintaining the sensor in a wet condition, even when the device is in a non-standard orientation (i.e. orientations in which the device is not used to perform its normal function). This is possible because the inactive states seals an internal volume of the device, containing the sensor, from the surroundings. That internal volume (referred to as a 'saturated volume' below) is filled with liquid. The absence of any air gaps and/or bubbles means the sensor isolated from the possibility of a gas/air interface intersecting with the sensor (which could damage the functionality of the sensor) even if the device is moved around. Further, even in the active state, the device is able to maintain the sensor in a wet condition, for a long period of time, even if the device is activated and then not used.

Figure 2:
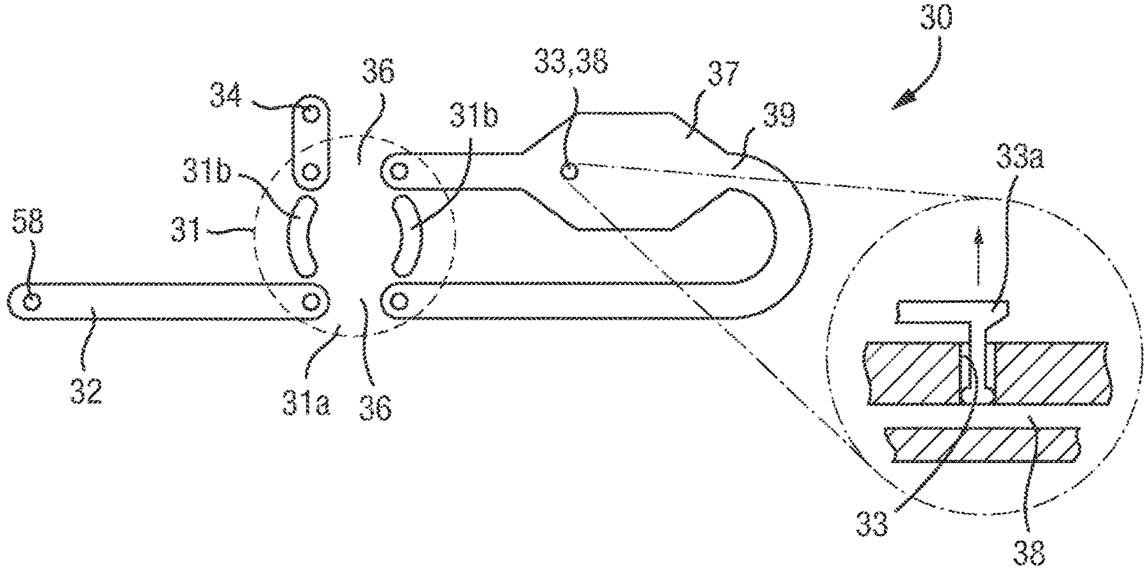
FIG. 2 shows an example of a microfluidic device.

FIG. 2 shows a top cross-sectional view of an example of a microfluidic device 30 with an inset showing a side cross-sectional view of a portion of the microfluidic device comprising a sample input port 33. The microfluidic device 30 comprises a sensing chamber 37, for housing a sensor.

Figure 1:
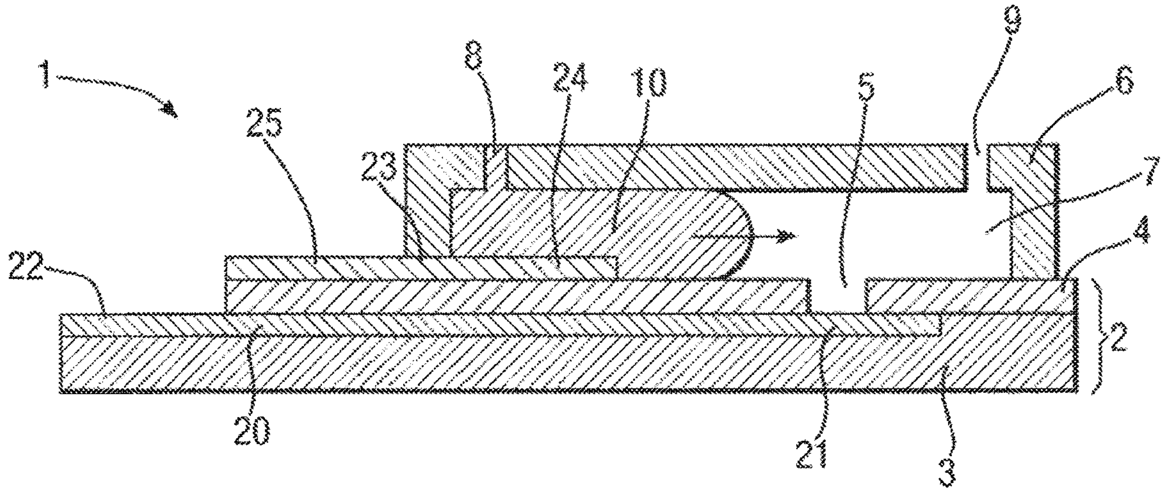
Fig. 1 Prior Art
FIG. 1 shows an prior art apparatus which may be used to form a layer of amphiphilic molecules.

The sensing chamber 37 is provided with a sensor, which is not shown in FIG. 2. The sensor may be a component or device for analyzing a liquid sample. For example, a sensor may be a component or device for detecting single molecules (e.g., biological and/or chemical analytes such as ions, glucose) present in a liquid sample. Different types of sensors for detecting biological and/or chemical analytes such as proteins, peptides, nucleic acids (e.g., RNA and DNA), and/or chemical molecules are known in the art and can be used in the sensing chamber. In some embodiments, a sensor comprises a membrane that is configured to permit ion flow from one side of the membrane to another side of the membrane. For example, the membrane can comprise a nanopore, e.g., a protein nanopore or solid-state nanopore. In some embodiments, the sensor may be of the type discussed with reference to FIG. 1, above, which is described in WO 2009/077734, the content of which is incorporated herein by reference The sensor is connected to an electrical circuit, in use. The sensor may be an ion selective membrane provide directly over an electrode surface or over a ionic solution provided in contact with an underlying electrode.

The sensor may comprise an electrode pair. One of more of the electrodes may be functionalised in order to detect an analyte. One or more of the electrodes may be coated with a selectively permeable membrane such as NafionTM.

Figure 3:
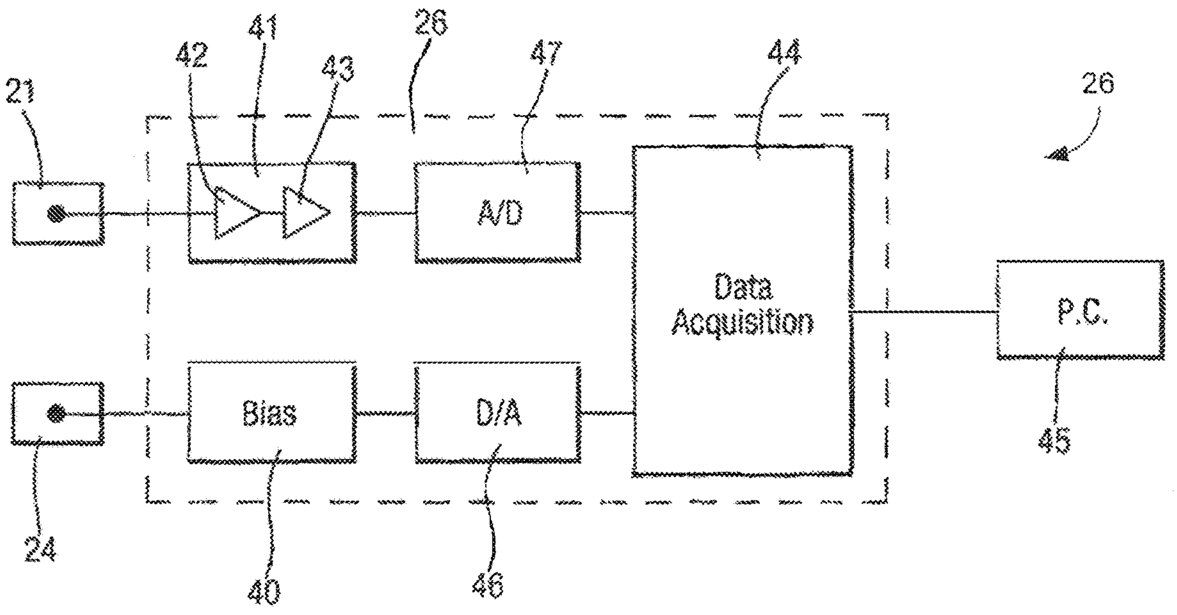
FIG. 3 shows an example design of an electrical circuit.

An example design of such an electrical circuit 26 is shown in FIG. 3. The primary function of the electrical circuit 26 is to measure the electrical signal (e.g., current signal) developed between the common electrode first body and an electrode of the electrode array. This may be simply an output of the measured signal, but in principle could also involve further analysis of the signal. The electrical circuit 26 needs to be sufficiently sensitive to detect and analyse currents which are typically very low. By way of example, an open membrane protein nanopore might typically pass current of 100 pA to 200 pA with a 1M salt solution. The chosen ionic concentration may vary and may be between for example 10 mM and 2M. Generally speaking the higher the ionic concentration the higher the current flow under a potential or chemical gradient. The magnitude of the potential difference applied across the membrane will also effect the current flow across the membrane and may be typically chosen to be a value between 50 mV and 2V, more typically between 100 mV and 1 V.

In this implementation, the electrode 24 is used as the array electrode and the electrode 21 is used as the common electrode. Thus the electrical circuit 26 provides the electrode 24 with a bias voltage potential relative to the electrode 21 which is itself at virtual ground potential and supplies the current signal to the electrical circuit 26.

The electrical circuit 26 has a bias circuit 40 connected to the electrode 24 and arranged to apply a bias voltage which effectively appears across the two electrodes 21 and 24.

The electrical circuit 26 also has an amplifier circuit 41 connected to the electrode 21 for amplifying the electrical current signal appearing across the two electrodes 21 and 24. Typically, the amplifier circuit 41 consists of a two amplifier stages 42 and 43.

The input amplifier stage 42 connected to the electrode 21 converts the current signal into a voltage signal.

The input amplifier stage 42 may comprise a transimpedance amplifier, such as an electrometer operational amplifier configured as an inverting amplifier with a high impedance feedback resistor, of for example 500MΩ, to provide the gain necessary to amplify the current signal which typically has a magnitude of the order of tens to hundreds of pA.

Alternatively, the input amplifier stage 42 may comprise a switched integrator amplifier. This is preferred for very small signals as the feedback element is a capacitor and virtually noiseless. In addition, a switched integrator amplifier has wider bandwidth capability. However, the integrator does have a dead time due to the necessity to reset the integrator before output saturation occurs. This dead time may be reduced to around a microsecond so is not of much consequence if the sampling rate required is much higher. A transimpedance amplifier is simpler if the bandwidth required is smaller. Generally, the switched integrator amplifier output is sampled at the end of each sampling period followed by a reset pulse. Additional techniques can be used to sample the start of integration eliminating small errors in the system.

The second amplifier stage 43 amplifies and filters the voltage signal output by the first amplifier stage 42. The second amplifier stage 43 provides sufficient gain to raise the signal to a sufficient level for processing in a data acquisition unit 44. For example with a 500MΩ feedback resistance in the first amplifier stage 42, the input voltage to the second amplifier stage 43, given a typical current signal of the order of 100 pA, will be of the order of 50 mV, and in this case the second amplifier stage 43 must provide a gain of 50 to raise the 50 mV signal range to 2.5V.

The electrical circuit 26 includes a data acquisition unit 44 which may be a microprocessor running an appropriate program or may include dedicated hardware. In this case, the bias circuit 40 is simply formed by an inverting amplifier supplied with a signal from a digital-to-analog converter 46 which may be either a dedicated device or a part of the data acquisition unit 44 and which provides a voltage output dependent on the code loaded into the data acquisition unit 44 from software. Similarly, the signals from the amplifier circuit 41 are supplied to the data acquisition card 40 through an analog-to-digital converter 47.

The various components of the electrical circuit 26 may be formed by separate components or any of the components may be integrated into a common semiconductor chip. The components of the electrical circuit 26 may be formed by components arranged on a printed circuit board. In order to process multiple signals from the array of electrodes the electrical circuit 26 is modified essentially by replicating the amplifier circuit 41 and A/D converter 47 for each electrode 21 to allow acquisition of signals from each recess 5 in parallel. In the case that the input amplifier stage 42 comprises switched integrators then those would require a digital control system to handle the sample-and-hold signal and reset integrator signals. The digital control system is most conveniently configured on a field-programmable-gate-array device (FPGA). In addition the FPGA can incorporate processor-like functions and logic required to interface with standard communication protocols i.e. USB and Ethernet. Due to the fact that the electrode 21 is held at ground, it is practical to provide it as common to the array of electrodes.

In such a system, polymers such as polynucleotides or nucleic acids, polypeptides such as a protein, polysaccharides or any other polymers (natural or synthetic) may be passed through a suitably sized nanopore. In the case of a polynucleotide or nucleic acid, the polymer unit may be nucleotides. As such, molecules pass through a nanopore, whilst the electrical properties across the nanopore are monitored and a signal, characteristic of the particular polymer units passing through the nanopore, is obtained. The signal can thus be used to identify the sequence of polymer units in the polymer molecule or determine a sequence characteristic. A variety of different types of measurements may be made. This includes without limitation: electrical measurements and optical measurements. A suitable optical method involving the measurement of fluorescence is disclosed by J. Am. Chem. Soc. 2009, 131 1652-1653. Possible electrical measurements include: current measurements, impedance measurements, tunnelling measurements (Ivanov A P et al., Nano Lett. 2011 Jan. 12; 11(1):279-85), and FET measurements (International Application WO 2005/124888). Optical measurements may be combined with electrical measurements (Soni G V et al., Rev Sci Instrum. 2010 January; 81(1):014301). The measurement may be a transmembrane current measurement such as measurement of ionic current flowing through the pore.

The polymer may be a polynucleotide (or nucleic acid), a polypeptide such as a protein, a polysaccharide, or any other polymer. The polymer may be natural or synthetic. The polymer units may be nucleotides. The nucleotides may be of different types that include different nucleobases.

The nanopore may be a transmembrane protein pore, selected for example from MspA, lysenin, alpha-hemolysin, CsgG or variants or mutations thereof.

The polynucleotide may be deoxyribonucleic acid (DNA), ribonucleic acid (RNA), cDNA or a synthetic nucleic acid known in the art, such as peptide nucleic acid (PNA), glycerol nucleic acid (GNA), threose nucleic acid (TNA), locked nucleic acid (LNA) or other synthetic polymers with nucleotide side chains. The polynucleotide may be single-stranded, be double-stranded or comprise both single-stranded and double-stranded regions. Typically cDNA, RNA, GNA, TNA or LNA are single stranded.

In some embodiments, the devices and/or methods described herein may be used to identify any nucleotide. The nucleotide can be naturally occurring or artificial. A nucleotide typically contains a nucleobase (which may be shortened herein to "base"), a sugar and at least one phosphate group. The nucleobase is typically heterocyclic. Suitable nucleobases include purines and pyrimidines and more specifically adenine, guanine, thymine, uracil and cytosine. The sugar is typically a pentose sugar. Suitable sugars include, but are not limited to, ribose and deoxyribose. The nucleotide is typically a ribonucleotide or deoxyribonucleotide. The nucleotide typically contains a monophosphate, diphosphate or triphosphate.

The nucleotide can include a damaged or epigenetic base. The nucleotide can be labelled or modified to act as a marker with a distinct signal. This technique can be used to identify the absence of a base, for example, an abasic unit or spacer in the polynucleotide. Of particular use when considering measurements of modified or damaged DNA (or similar systems) are the methods where complementary data are considered. The additional information provided allows distinction between a larger number of underlying states.

The polymer may also be a type of polymer other than a polynucleotide, some non-limitative examples of which are as follows.

The polymer may be a polypeptide, in which case the polymer units may be amino acids that are naturally occurring or synthetic.

The polymer may be a polysaccharide, in which case the polymer units may be monosaccharides.

A conditioning liquid provided in the device to maintain the sensor in a wet state may be any liquid that is compatible with the device (e.g., a liquid that does not adversely affect the performance of the sensor) By way of example only, when the sensor comprise a protein nanopore, it would be apparent to one of ordinary skill in the art that the conditioning liquid should be free of an agent that denatures or inactivates proteins. The conditioning liquid may for example comprise a buffer liquid, e.g., an ionic liquid or ionic solution. The conditioning liquid may contain a buffering agent to maintain the pH of the solution.

The sensor is one that needs to be maintained in a 'wet condition', namely one which is covered by a liquid. The sensor may comprise a membrane, such as for example an ion selective membrane or amphiphilic membrane. The membrane, which may be amphiphilic, may comprise an ion channel such as a nanopore.

The membrane, which may be amphiphilic, may be a lipid bilayer or a synthetic layer. The synthetic layer may be a diblock or triblock copolymer.

The membrane may comprise an ion channel, such an ion selective channel, for the detection of anions and cations. The ion channel may be selected from known ionophores such as valinomycin, gramicidin and 14 crown 4 derivatives.

Returning to FIG. 2, the sensing chamber has a liquid inlet 38, and a liquid outlet 39, for respectively passing liquid into and out of the sensing chamber 37. In the inset of FIG. 2, it is shown, in cross section through the device 30, that the inlet 38 is in fluid communication with a sample input port 33. The sample input port 33 is configured for introducing, e.g delivering, a sample to the microfluidic device 30, e.g. for testing or sensing. A seal 33A, such as a plug, may be provided to seal or close the sample input port 33, when the device 30 is in its inactive state, to avoid any fluid ingress or egress through the sample input port 33. As such, the seal 33A may be provided within the sample input port 33 in the inactive state. Preferably the seal 33A is removable and replaceable. The sample input port may be desirably situated close to the sensing chamber, such as shown in FIG. 2, wherein the port is provided directly at the sensing chamber. This reduces the volume of sample liquid that needs to be applied to the device by reducing the volume of the flow path.

Downstream from the outlet 39 of the sensing chamber 37 is a liquid collection channel 32. The liquid collection channel can be a waste collection reservoir, and is for receiving fluid that has been expelled from the sensing chamber 37. At the most downstream end, e.g. the end portion, of the collection channel 32 is a breather port 58, for allowing gas to be expelled as the collection channel 32 receives liquid from the sensing chamber and fills with the liquid.

In the example shown in FIG. 2, upstream of the sensing chamber 37, is a liquid supply port 34, which is optional. This port provides the opportunity to supply liquid, for example a buffer, into the device, once the device 30 is in its active state. It can also be used for delivering larger volume samples, if desired, and for high volume flushing/perfusion of previous samples from the sensing chamber 37 before a new sample is delivered.

As described below in more, the device is configured to accept a sample at the sample input port, which is subsequently drawn into the sensing chamber of its own accord, without the aid of an external force or pressure, e.g. by capillary pressure as described below. This removes the need for the user to introduce a test liquid into the device under an applied positive pressure.

In FIG. 2, the device 30 is in an inactive state. This is achieved by the provision of a valve 31 which is configured in a close state, which is a state that does not permit fluid flow between the liquid collection channel 32 and the sensing chamber 37, as well as the provision of the seal 33A on the sample input port 33, which seals or closes the sample input port 33 . . . . In the inactive state, as shown in FIG. 2, flow through the sensing chamber 37 is not possible. The valve 31 in a closed state is a structure that serves as a flow path interruption between the liquid outlet 39 of the sensing chamber 37 and the liquid collection channel 32, preventing upstream liquid (e.g., liquid from the sensing chamber 37) from flowing into the liquid collection channel 32. Similarly, the valve 31 in a closed state is a structure that serves as a flow path interruption between the supply port 34 and the sensing chamber 37, preventing upstream liquid (e.g., liquid introduced through the supply port) from flowing into the sensing chamber 37. As such, the sensing chamber 37 is isolated from the supply port 34 and the waste collection reservoir, in the form of liquid collection channel 32 (which may be open to the atmosphere). Further, the provision of the plug 33A sealing the sample input port 33 ensures that the sensing chamber 37 is entirely isolated. The plug 33A can also serve an additional purpose: when it is removed it can created a ‘suction’ in the inlet 38, ensuring that the port 33 becomes wetted (and hence ready to receive sample fluid) as the plug 33A is removed. As such, the plug 33A provides a priming action. The priming action can draw fluid from the liquid collection channel (e.g., indirectly, displacing fluid into the sensing chamber 37, which in turn is displaced into the inlet 38 and the port 33) or a separate priming reservoir (see examples below).

In some embodiments, the valve 31serves a dual function. For example, as shown in FIG. 2, the valve 31 can be configured in a state such that it acts an activation system. An activation system can complete the flow path between the liquid outlet 39 and the liquid collection channel 32 (and also the flow path between the supply port 34 and the sensing chamber 37). Further, as discussed in more detail below, such activation occurs without draining the sensor chamber 37 of liquid. That is, the sensor 37 remains unexposed to gas or a gas/liquid interface after activation. In the example of FIG. 2, this is achieved by rotation of the valve 31 by 90° (from the depicted orientation) within the valve seat 31A. This leads to channels 31B of the valve completing flow path interruptions 36 between the liquid outlet 39 and the liquid collection channel 32, as well as between the buffer liquid input port 34 and the sensing chamber 37. In that active state, it is possible for liquid to flow from the buffer supply port 34 (also referred to herein as a ‘purge port’) through the sensing chamber 37 and into the liquid collection channel 32. However such flow does not occur freely, as discussed in more detail in connections with FIGS. 5*a-f*, below.

As a result, the sensing chamber 37 can be pre-filled with a conditioning liquid, such as a buffer, before turning the valve 31 into the position shown in FIG. 2. It should be noted that the type of the conditioning liquid is not particularly limited according to the invention, but should be suitable according to the nature of the sensor 35. Assuming the plug 33A has been inserted and that the sensor chamber 37 is appropriately filled so that there are no air bubbles, there is then no opportunity for the sensor to come into contact with a gas/liquid interface which would potentially be damaging to the sensor. As such, the device 30 can be robustly handled, without fear of damaging the sensor itself.

Figure 4A:
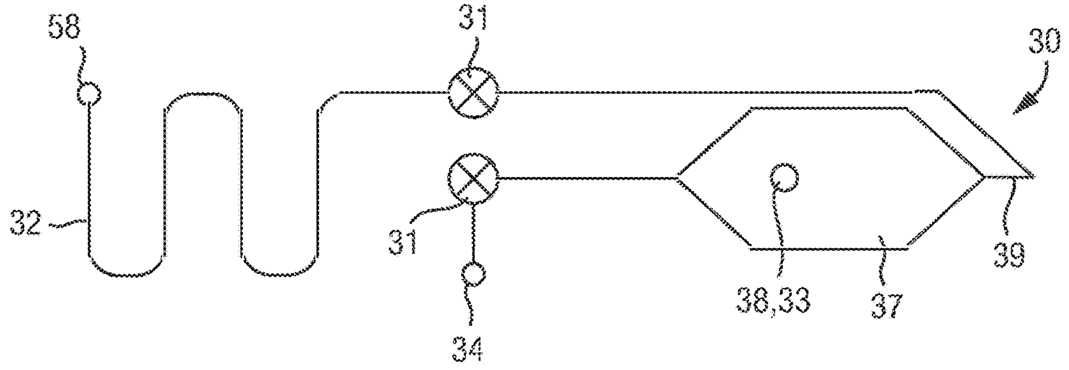
FIG. 4*a* shows a schematic of a device corresponding to that of FIG. 2.

FIG. 4*a* shows a schematic of a device 30 corresponding to that of FIG. 2. In FIG. 4, the fluid channels are simply shown as lines. Further, the valve 31 is shown as two separate valves 31 upstream and downstream of the sensing chamber 37. This is for the sake of clarity, but in some embodiments it may be desirable to have two separate valves 31 as shown.

Figure 4B:
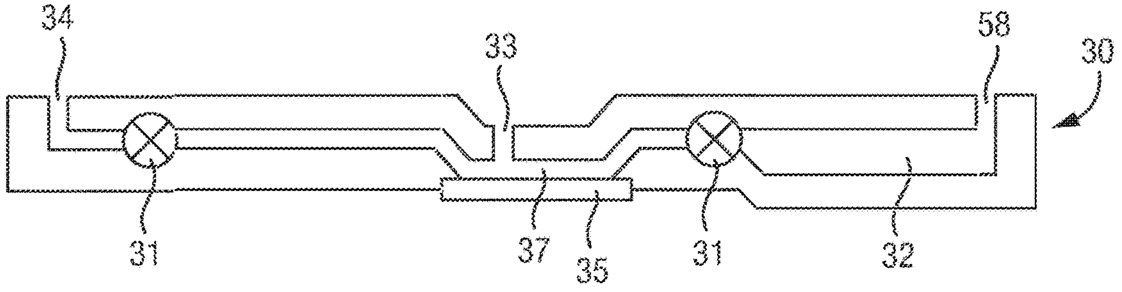
FIG. 4*b* shows a schematic cross-section along the flow path through the device of FIG. 4*a;*

FIG. 4*b* shows a schematic cross-section along the flow path through the device of FIG. 4*a*. This may not be a ‘real’ cross-section, in the sense that the flow path may not be linear in the way depicted in FIG. 4*b*. Nonetheless, the schematic is useful in understanding the flow paths available to the liquid in the device 30. In particular, the upstream buffer supply/purge port 34 can be seen to be separated from the sensing chamber by upstream valve 31. Further downstream breather port 58 can be seen to be separated from the sensing chamber 37 by downstream valve 31. As such, it becomes readily apparent that the sensing chamber 37 may be filled with fluid and isolated from the upstream and downstream ports 34 and 58. Further, by providing a seal over sample input port 33, the sensing chamber can be entirely isolated.

It is also instructive to consider the scale of the features presented in FIGS. 4*a* and 4*b*.

The purge port 34 and the sample input port 33 may be of similar design, as both are configured to receive a fluid to be delivered to the device 30. In some embodiments, the ports 33 and/or 34 may be designed to accommodate the use of a liquid delivery device, e.g., a pipette tip, to introduce liquid into the ports. In preferred embodiments, both ports have a diameter of around 0.4 to 0.7 mm, which allows for wicking of fluid into the ports whilst also limiting the possibility of the device 30 free-draining of liquid (discussed in more detail below). In contrast the size of the downstream breather port 58 is less important, as it is not intended, in routine use, for accepting liquid delivery devices (e.g., pipettes) or delivering liquid.

The size of the sensor any vary and depend upon the type and the number of sensing elements, for example nanopores or ion selective electrodes, provided in the sensor. The size of the sensor 35 may be around 8×15 mm. As discussed above, it can be an array of sensing channels, with a microscopic surface geometry that contains membranes with nanopores.

The 'saturated volume' of the device 30 is the volume, e.g. the flow path volume, connecting between the valves 31 (one valve controls flow between the liquid outlet 39 and the liquid collection channel 32, and another valve controls flow between the buffer liquid input port 34 and the sensing chamber 37) that can be filled with liquid and sealed and isolated from the surroundings when the plug 33*a* is present, i.e. to seal the simple input port 33, and valves 31 are configured in a closed state. In one embodiment, the saturated volume can be around 200 μl, which can vary depending on the design of the flow path in the devices described herein. However, smaller volumes are more preferable (to reduce the size of sample required, for example) and preferably the saturated volume is 20 μl or less. In other configurations, the provision of the purge port 34 (and connecting fluid path to the sensing chamber 37) may not be necessary, in which case the saturated volume will extend from the sealed sample input port 33 to the sensing chamber 37and past the liquid outlet 39 to the flow path interruption 36.

In contrast it is desirable for the liquid collection channel 32 to have a much larger volume, e.g., a volume that is at least 3-fold larger, e.g., at least 4-fold larger, at least 5-fold larger, at least 10-fold larger, or at least 15-fold larger, than the saturated volume, so it can collect liquid expelled from the saturated volume over several cycles of testing and flushing. In one embodiment, the liquid collection channel 32 may have a volume of 2000 μl, The hydraulic radius of the liquid collection channel is typically 4 mm or less.

The sizes of the valves 31 are not particularly important (and, as discussed below, alternative flow channel interruptions can be provided). They serve the function of isolating the saturated volume in connection with the plug 33*a*.

Further, even in the active state, the device is resistant to the sensing chamber 37 drying out. This is discussed below, with reference to FIG. 5*a*, which is a schematic cross-section of the sensing chamber 37 according to one embodiment and surrounding connections of the device 30 of FIG. 2 or FIG. 4, for example.

Figure 5A:
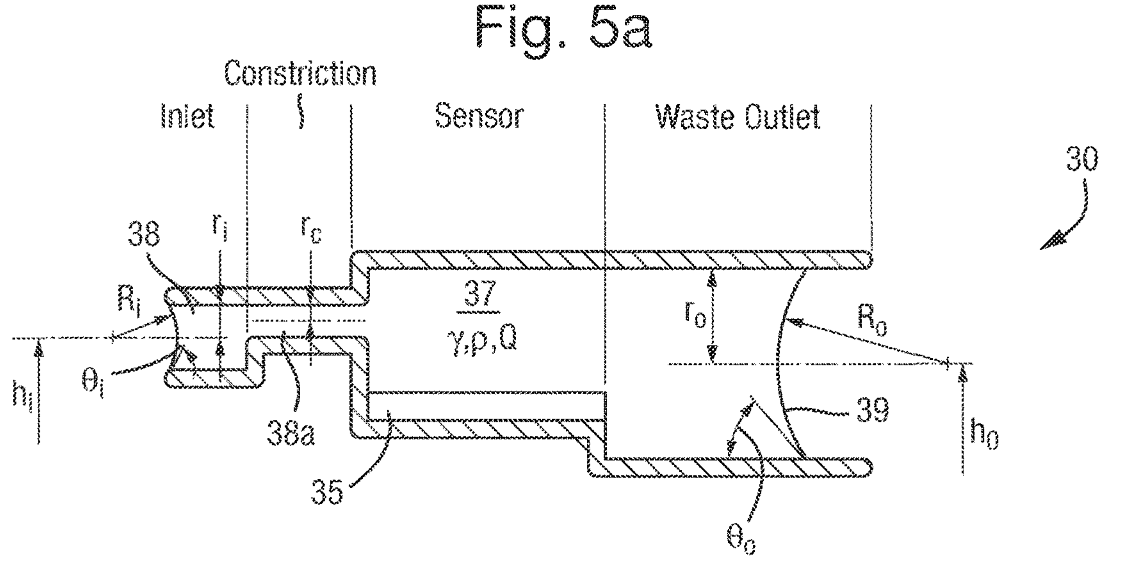
FIG. 5*a* is a schematic cross-section of a sensing chamber and surrounding connections of the device of FIG. 2 or FIG. 4, for example.

In FIG. 5*a*, the sensor 35 is provided in a sensing chamber 37. The sensing chamber liquid inlet 38 is connected upstream of the sensing chamber 37, for simplicity of presentation (i.e. although the liquid inlet 38 is shown as entering sensing chamber 37 from above in FIGS. 2 and 4, the change in location in FIG. 5*a* does not affect the outcome of the analysis below). FIG. 5*a* shows a further restriction 38*a* in the diameter of the liquid inlet before it reaches the sensing chamber 37. This could be for example, due to a widening of the input 33 to ease sample collection/provision. Downstream of the sensing chamber 37 is the liquid outlet 39 to the liquid collection channel 32.

In the diagram, several parameters and dimensions are indicated. Heights (measured in metres) are indicated by the symbol h. Radii of curvature (measured in metres) are indicated by the symbol R. Radii of the tubular parts (measured in metres) are indicated by the symbol r. Surface tension (measured in N/m) is indicated by the symbol γ. Liquid density (measured in kg/m$^3$) is indicated by the symbol ρ. Flow rates (measured in m$^3$/s) is indicated by the symbol Q. Contact angles (measured in degrees) of liquid/gas meniscii with the device 30 walls, are indicated by the symbol θ. The subscripts "i" are used to refer to conditions at the inlet, the subscript "c" is used to indicate conditions at the constriction, and the subscript "o" is used to indicate conditions at the outlet.

The behaviour of fluid in the depicted system is controlled by capillary and/or Laplace bubble pressures and Poiseuille pressure drops to limit flow rates. As is generally known, capillary pressure at a meniscus can be calculated using the equation:

$$P_c = \gamma\left(\frac{1}{R_1} + \frac{1}{R_2}\right) \quad \text{Equation 1}$$

where $R_1$, and $R_2$ are radii of curvature in perpendicular directions. In the case of a tube, such as a capillary, the radius of curvature $R_1$ is the same as the radius of curvature $R_2$ and the radius of curvature is related to the radius of the tube by the following equation:

$$R = \frac{r}{\cos\theta} \quad \text{Equation 2}$$

Further, in a rectangular channel, where $R_1$ is not the same as $R_2$, the radii of curvature are given by the following equations:

$$R_1 = \frac{a/2}{\cos\theta};\ R_2 = \frac{b/2}{\cos\theta} \quad \text{Equation 3}$$

where α is e.g. the width of the rectangular section, and b is the height of the rectangular section.

For incompressible Newtonian fluids, assuming un-accelerated lamina flow in a pipe of constant circular cross-section that is substantially longer than its diameter, the pressure losses can be calculated from the Hagen-Poiseuille equation:

$$P_{FR} = \frac{8\mu lQ}{\pi r^4} \qquad \text{Equation 4}$$

where μ is the viscosity (measured in N·s/$m^2$) of the liquid, l is the length of the tube through which flow occurs (in metres) and r is the radius of the tube (in metres).

Finally, static pressure is calculated according to the following equation:

$$P_h = \rho gh \qquad \text{Equation 5}$$

in which g is the acceleration due to gravity (9.81 m/$s^2$), and h is the height of the fluid column.

Figure 5B:
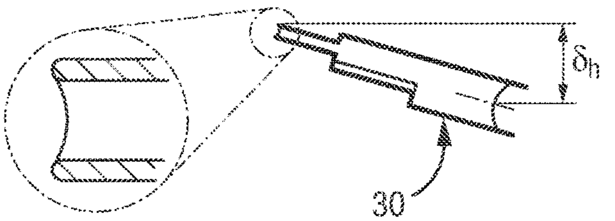
FIG. 5*b* illustrates a scenario in which an activated device is tilted to encourage fluid in the device to drain into the waste collection channel.

FIG. 5*b* illustrates a scenario in which an activated device 30 is tilted to encourage fluid in the device 30 to drain into the liquid collection channel 32. When considering whether fluid will remain at the opening to the inlet 38 (i.e. the sample input port 33), it can be understood that the capillary pressure at the inlet ($P_{ci}$) must be equal to or greater than the capillary pressure at the outlet plus any difference in hydrostatic pressure brought about by the inlet not being at the same height as the outlet (that difference in height being denoted as δh in FIG. 5*b* and the equations below) to avoid free draining. This is set out in the following equation:

$$P_{c1} \geq P_{c0} + \rho g \cdot \delta h$$

From this equation, in combination with equations 1 and 2, the maximum height difference δh before free draining occurs can be deduced (assuming the same contact angle θ at the inlet and the outlet):

$$\frac{2\gamma\cos\theta}{r_i} = \frac{2\gamma\cos\theta}{r_o} + \rho g.\delta h$$

$$\delta h = \frac{\frac{2\gamma\cos\theta}{r_i} - \frac{2\gamma\cos\theta}{r_o}}{\rho g}$$

$$\delta h = \left(\frac{1}{r_i} - \frac{1}{r_o}\right)\frac{2\gamma\cos\theta}{\rho g}$$

Substituting typical values of the relevant variables (e.g. $r_i$=0.4 mm, $r_0$=3.0 mm, θ=82°, ρ=1000 kg/$m^3$, γ-0.072 N/m), indicates that a difference in height of about 4 mm can be achieved before the inlet de-wets.

Figure 5C:
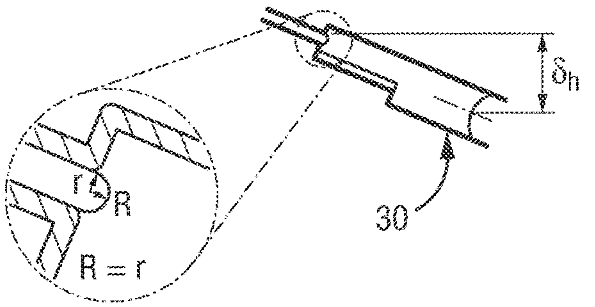
FIG. 5*c* shows a difference in height between an inlet and an outlet.

Considering this further, and as shown in FIG. 5*c*, if the difference in height exceeds this critical value, the meniscus at the input port 33 will retreat to the inlet to the sensing chamber. In the limit before the meniscus detaches from that inlet (i.e. allowing gas into the sensing chamber 37), the meniscus will have the maximum radius of curvature, being equal to the radius of the inlet (ignoring any constriction 38*a*). In that case, the contact angle θ will be zero and so the non-draining scenario is described by:

$$P_{c1} \geq P_h + P_{c0}$$

and in the limit:

$$\frac{2\gamma\cos\theta_i}{r_i} = \rho g.\delta h + \frac{2\gamma\cos\theta_o}{r_o}$$

$$\delta h = \frac{\frac{2\gamma}{r_i} - \frac{2\gamma\cos\theta_o}{r_o}}{\rho g}$$

$$\delta h = \frac{2\gamma}{\rho g}\left(\frac{1}{r_i} - \frac{\cos\theta_o}{r_o}\right)$$

Again, using the typical values mentioned above, this indicates that the allowable difference in height between the inlet to the sensing chamber and the downstream meniscus and the waste outlet can be of the order of 36 mm. As a result, even if the inlet port 33 itself does not remain wetted, it is unlikely that the sensing chamber 37 will de-wet in normal use, as this is quite a substantial height difference, which would indicate an unusual amount of tilting.

Figure 5D:
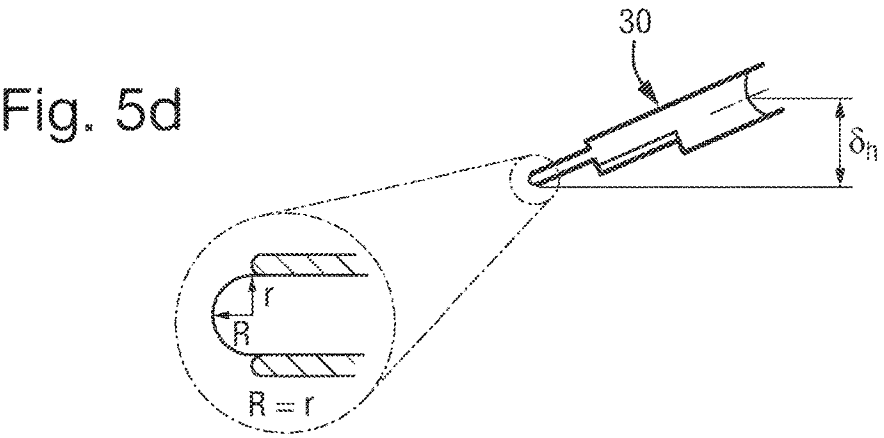
FIGS. 5*d*-5*f* show scenarios for the sensing chamber.

Further, it is unlikely that the sensing chamber will de-wet by dripping out of the inlet. As shown in FIG. 5*d*, the other extreme to the scenario previously considered is the limit before the liquid starts to drip from the inlet. Again, in this case, the radius of curvature of the meniscus (this time in the other direction) to equal the radius of curvature of the inlet capillary itself. In this case, assuming that &h is the difference in height between the inlet meniscus and the outlet meniscus, and that the outlet is raised to encourage flow out of the inlet, the non-drip scenario is described by:

$$P_{c1} \geq P_h + P_{c0}$$

and in the limit:

$$\frac{2\gamma\cos\theta_i}{r_i} = \rho g.\delta h + \frac{2\gamma\cos\theta_o}{r_o}$$

$$\delta h = \frac{\frac{2\gamma}{r_i} - \frac{2\gamma\cos\theta_o}{r_o}}{\rho g}$$

$$\delta h = \frac{2\gamma}{\rho g}\left(\frac{1}{r_i} - \frac{\cos\theta_o}{r_o}\right)$$

Once again, substituting typical values indicates that the maximum allowable δh is of the order of 37 mm. Once again, this is well within a tolerable range for normal handling in use.

Therefore, from the above analysis, it can be seen that once the device 30 is switched from an inactive state to an active state, the liquid sensor 35 will remain wetted, in normal conditions. Further, even if the input port 33 becomes de-wetted, this will not necessarily result in the sensor being exposed to a gas/liquid interface, because the interface is likely to be pinned at the entrance to the sensing chamber 37.

Figure 5E:
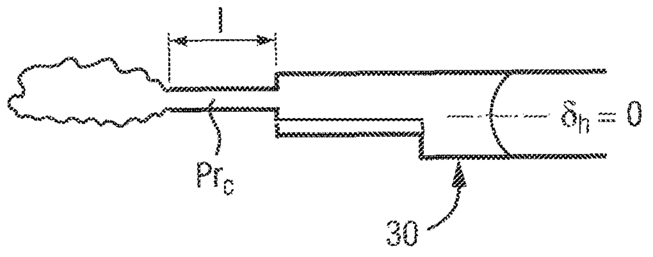

It is also possible to consider how this stability affects the ability to deliver sample to the sensing chamber 37. In FIG. 5*e* a first extreme of wicking a fluid from a 'puddle' into the input port 33 is considered. In that case, the capillary pressure acting to drawn the fluid in is balanced by the laminar flow losses in the inlet (having length l):

$$P_{co} = \frac{8\mu lQ}{\pi r_c^4} = \frac{2\gamma\cos\theta}{r_o}$$

-continued $$Q = \frac{2\gamma\cos\theta}{r_o} \cdot \frac{\pi r_c^4}{8\mu l}$$

Applying the typical values (including μ=8.9×10$^{-4}$ N·s/m$^2$ and l=3 mm), a flowrate of 25 μl/s can be derived. This is more than sufficient when sample volumes are low, such as in microfluidic devices having a total volume of around 200 μl for example.

Figure 5F:
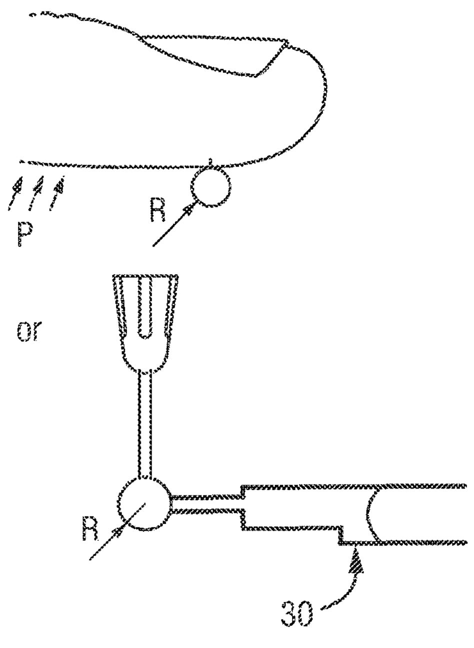

In another extreme, shown in FIG. 5*f*, the sample may be supplied to the input port 33 as droplet (e.g. a drop of blood from a finger or a droplet from a pipette). In that case, the driving force is the Laplace bubble pressure for the droplet:

$$\Delta P = \frac{2\gamma}{R}$$

For a 1 mm droplet, the pressure is around 144 Pa (using the typical values). A 2D approximation, in comparison to the puddle wicking scenario, indicates that this around 20 times greater, and so a flowrate of around 500 μl/s can be expected for the same viscous drag.

As a result, it can be seen that the device 30, e.g., the dimensions of the inlet 38 and outlet 39 as well as the liquid collection channel 32, can be configured not only to robustly maintain a wetted state in the sensing chamber 37, but may also to operate easily to draw fluid into the sensing chamber 37. When the sample has been supplied, the device 30 returns to a new equilibrium, in which the device will not de-wet/drain dry. That is, the device 30 is configured to avoid free draining of the sensing chamber 37. In particular, the sample input port 33, the sensing chamber inlet 38 and the liquid collection channel 32 are configured to avoid such draining, such that when the activation system has been operated to complete the flow path downstream of the sensing chamber 37, the sensor 35 remains unexposed to gas or a gas/liquid interface even whilst the device 30 is tilted. Put another way, the sensing chamber inlet 33 and the liquid collection channel 32 are thus configured to balance capillary pressures and flow resistances to avoid free draining of the sensing chamber 37 when the flow path is completed.

In considering how the sensing chamber inlet and liquid collection channel are configured to balance capillary pressures and flow resistances, it is helpful to consider the how the device practically functions. Priming of the device into its 'active state' is achieved by completing the flow path between the liquid outlet and the liquid collection channel 32. The capillary pressures at the downstream collection channel and the sample input port are balanced such that following activation of the device, gas is not drawn into the sample inlet port, and the sample input port presents a wet surface to a test liquid. If it were the case that the capillary pressure at the liquid collection channel was greater than at the sample input port, the device would drain following activation, with buffer liquid being drawn into the collection channel.

Following activation of the device and prior to addition of a test liquid, the device may be considered to be at equilibrium, namely wherein the pressure at the input port is equal to the pressure at the downstream collection channel. In this equilibrium state, liquid remains in the sensing chamber and gas is not drawn into the input port such that the input port presents a wet surface to a test liquid to be introduced into the device. The device is configured to ensure that balance of forces are such that the sensing chamber remains filled with liquid and that liquid remains (at least partially) in the inlet, in the outlet and the liquid collection channel. If the equilibrium is disturbed by shifting the position of the liquid (without adding or removing liquid to the system) there is an impetus to return to that equilibrium. When the liquid is moved, it will create new gas/liquid interfaces. Thus this balance of force and restoring of the equilibrium will effectively be controlled by the capillary forces at those interfaces.

Ideally, the balance of force is such that following activation or addition of a volume of liquid, the liquid fills the sample input port and presents a wet surface. However, some adjustment may be necessary following activation/perfusion in order to provide a wet surface at the sample input port. In any case, the inlet port is configured such that following addition of a test liquid to the port, the capillary pressure at the input port is less than the capillary pressure at the downstream collection channel. This provides the driving force to draw test liquid into the device thereby displacing liquid from the sensing chamber into the liquid collection channel. This continues until the pressures at the sample input port and the liquid collection channel once more reach equilibrium. This driving force may be provided by the change in shape of a volume of liquid applied to the input port, as outlined by equation 1, wherein a volume of fluid applied to the port, such as shown in FIG. 5*f* having a particular radius of curvature, 'collapses' into the port, thus reducing the effective rate of curvature and supplying a Laplace pressure (there may also be other components of the overall driving pressure, e.g. due to the head of pressure of the volume of the test liquid, which will reduce in time as that volume is introduced into the device). The liquid inlet diameter is advantageously less than the diameter of the liquid collection channel such that fluid is located at the input port and over the sensor and that the liquid is present in the device as a continuous phase as opposed to discrete phases separated by gas.

A further volume of sample may be subsequently applied to the device in order to further displace buffer liquid from the sensing chamber. This may be repeated a number of times such that the buffer liquid is removed from the sensor in sensing chamber and replaced by the test liquid. The number of times required to completely displace buffer liquid from the sensor will be determined by the internal volume of the device, the volume of test sample applied as well as the degree of driving force that may be achieved.

Thus in this particular embodiment, a test liquid may be drawn into the device and displace the buffer liquid without the need for the user to apply additional positive pressure, for example by use of a pipette. This has the advantage of simplifying the application of a test liquid to the device. Surprisingly and advantageously, the invention provides a device that may be provided in a 'wet state' wherein liquid may be displaced from the device by the mere application of another liquid to the device.

Figure 6:
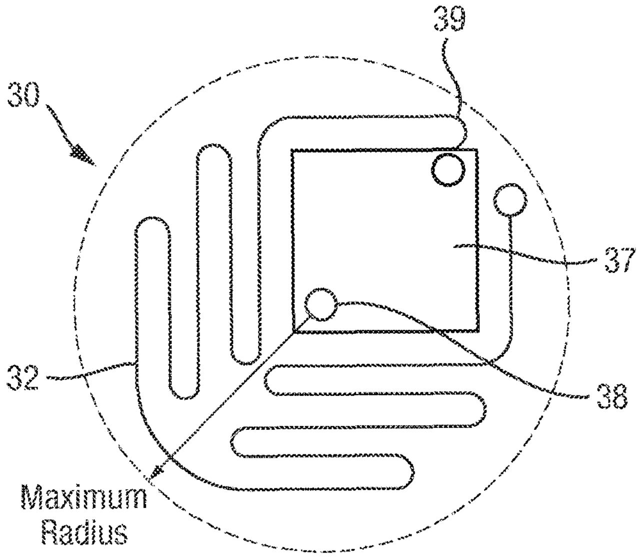
FIG. 6 is a schematic plan of a microfluidic device in an alternative configuration.

Further, the above analysis considers only a linear configuration. FIG. 6 is a schematic plan of an example microfluidic device 30 in an alternative configuration. In this configuration, the waste collection channel 32, downstream of the outlet 39 from the chamber 37 is provided in a twisting or tortuous path, to maintain the channel 32 within a defined maximum radius from the sample input port 38. Such a configuration allows for a large length (and hence volume) of the waste collection channel 32, whilst keeping the maximum distance of the downstream meniscus within the maximum radius. That maximum allowable radius is dictated by the allowable difference in height, between the input port 38 and the downstream meniscus, that does not result in the sensor chamber 37 draining. Put another way, a purely linear arrangement would result in the meniscus reaching the maximum allowable height difference after a certain amount of use, but in the tortuous arrangement the meniscus is diverted back to be closer to the input port 33 and so the critical condition is not reached. That is because the tortuous arrangement maintains the downstream meniscus closer to the input port, a larger angle of tilt is required to obtain the same difference in height (for any given amount of liquid in the downstream channel assuming the dimensions of the channel do not change, only the path of the channel).

Further, even if the sample input port 33 does de-wet, device 30 may be operable so as to re-prime the system in the active state. In the FIGS. 2 and 4 example, additional liquid can be supplied to the inlet 38 directly via the sample input port 33. Alternatively, re-wetting could be encouraged by drawing liquid back through from the outlet 39 and sensing chamber 37 into the inlet 38 and sample input port 33. Another alternative is for additional fluid to be provided via buffer supply port 34.

However, in other embodiments at least the downstream part of valve 31 of the FIG. 2 embodiment might be omitted, and replaced by another form flow path interruption. For example, the downstream waste channel 32 could be isolated from the saturated volume by a surface treatment (e.g. something hydrophobic), which would effectively form a barrier to upstream liquid until the interruption was removed by forced flow initiated by a priming or flushing action. Such a surface treatment would effectively be a hydrophobic valve. In effect, the interruption 36 may be any flow obstacle that may be removed or overcome by an activation system.

Figure 7:
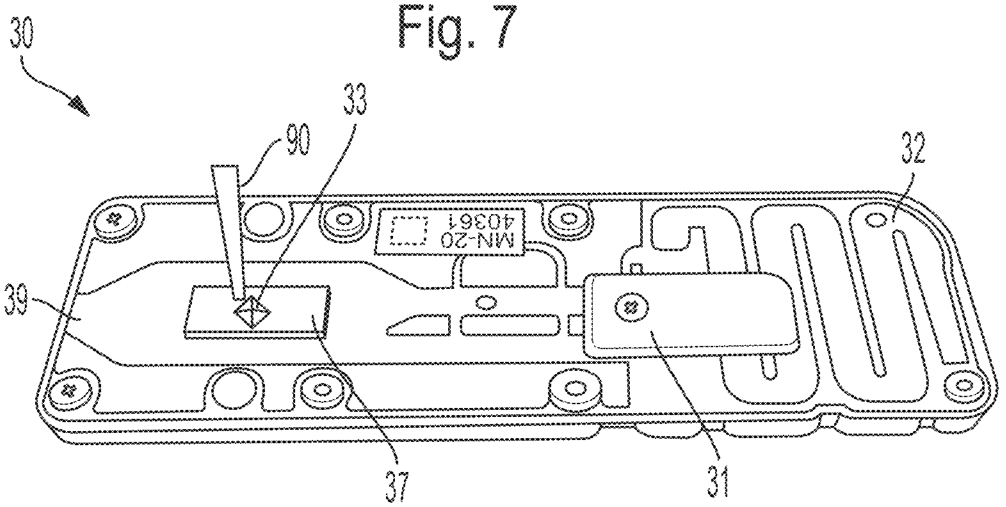
FIGS. 7 and 8 show example embodiments of the present invention.
Figure 8:
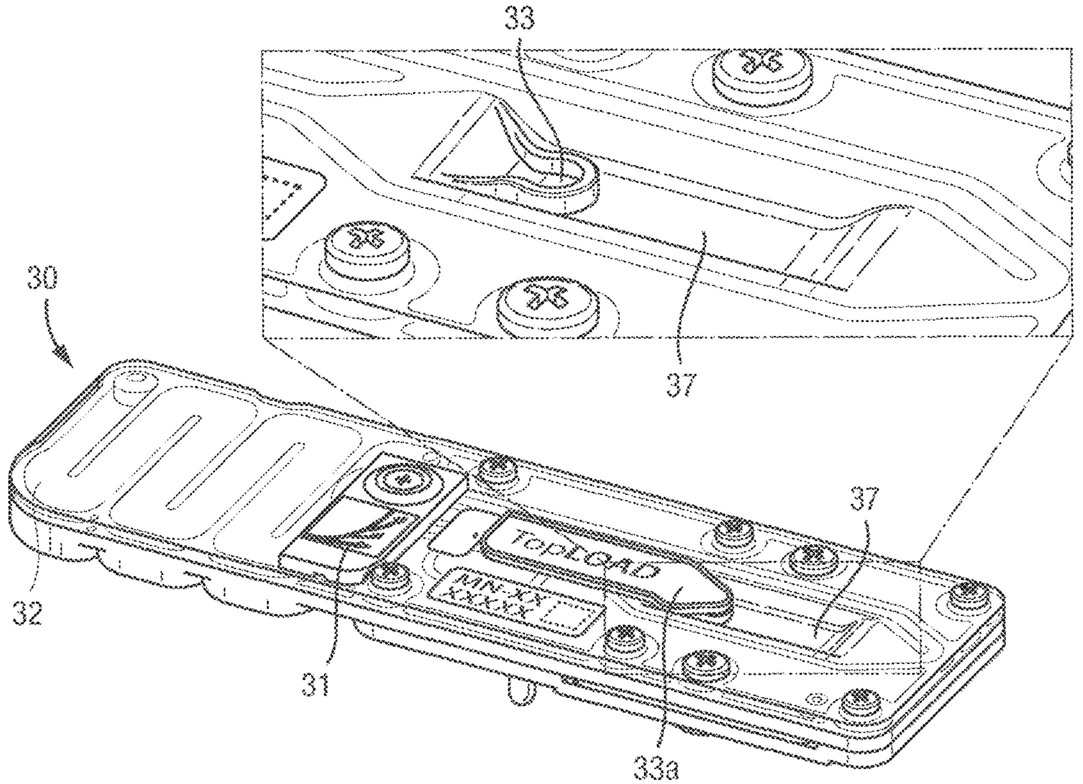

FIGS. 7 and 8 are example embodiments of the devices described herein.

FIG. 7 shows a device 30, in which a pipette 90 is being used to provide sample to the input port 33. The port 33 is provided centrally above the sensor in the sensing chamber 37, in this example. In this example, and the example of FIG. 8, a valve 31 of the type illustrated in FIG. 2 (i.e. a single valve which opens and closes both the upstream and downstream channels to the sample chamber 37) is provided.

In FIG. 8, the main image of the device 30 shows the presence of the plug or seal 33A on the sample input port. The expanded image shows the plug 33A removed, revealing the sample input port 33 below. In this example the sample input port 33 is provided at the most upstream end of the chamber 37 containing the sensor 35. This is advantageous because, in the activated state with the upstream purge port 58 closed, the sample chamber 37 can be filled quickly by forcing sample through port 33, so as to displace buffer liquid already in the sample chamber downstream (i.e. no upstream displacement is possible, due to the closed purge port 58).

Some operating scenarios of the microfluidic device 30 of the present invention (i.e. as exemplified by FIG. 8) are now discussed.

In a first configuration, valve 31 is open, as is sample port 33 (i.e. plug 33A is not present). Purge port/buffer supply port 34 is closed. In this configuration, a pipette may be used at breather port 38 to withdraw all liquid, including from the sample cell. Alternatively, if liquid is supplied to this port, it will displace fluid through the waste reservoir 32 into the sensor chamber 37 and out of the sample port 33.

In another configuration, valve 31 and sample input port 33 are open and breather port 58 is sealed. In this scenario, a pipette can provide fluid into the purge port 34, which will force fluid through the cell, into the sample chamber 37 (i.e. through the saturated volume) and downstream into the reservoir 32. This will also cause the sample input port 33 to wet if it has de-wetted. Alternatively, if the pipette is used to drain liquid, it is possible to drain the sensor chamber and the upstream portion of the device.

In another configuration, the valve 31, the purge port 34 and the breather port 58 are all open. In this configuration, a pipette may be supplied to the sample input port 33 to provide sample into the sensor chamber. Alternatively, if the pipette is applied to drain liquid from the sample input port 33, the sensor chamber 37 can be drained. If this is done slowly, it is also possible to draw liquid back from the waste reservoir 32.

In another scenario, the valve 31 and the purge port 34 are open, whilst the breather port 58 is closed. In this scenario, it is possible to apply fluid via the sample input port 33 to force fluid out of the purge port 34, if required. Alternatively, extracting liquid from the sample input port 33 will draw air into the cell via the purge port.

In another configuration, the valve 31 and the breather port 58 are open, whilst the purge port 34 is closed. In this scenario, a fluid supplied to the sample input port 33 can be pushed into the cell more quickly, without fluid spilling from the purge port. Alternatively, extracting fluid from the sample input port 33 in this scenario will drain the cell and the downstream waste, if done quickly.

In a further two configurations, the valve 31 is closed. In some configurations, closing valve 31 may connect the upstream purge port 34 to the downstream waste reservoir 32, at the same time as isolating the sensing chamber (i.e. in the arrangement of FIG. 2, the upstream purge port 34 is not so connected to the downstream waste 32, but increasing the length of the valve channel 31B could result in such a connection). When such a connection is made, it is possible to either fill the waste from the breather port 58 (i.e. so that any liquid spills from the purge port 34) or to fill the waste from the purge port 34 (i.e. so that any liquid spills from the breather port 58). Further, the waste may be emptied by withdrawing liquid from either of the purge port 34 or the breather port 58 (assuming the other one is open).

Figure 9:
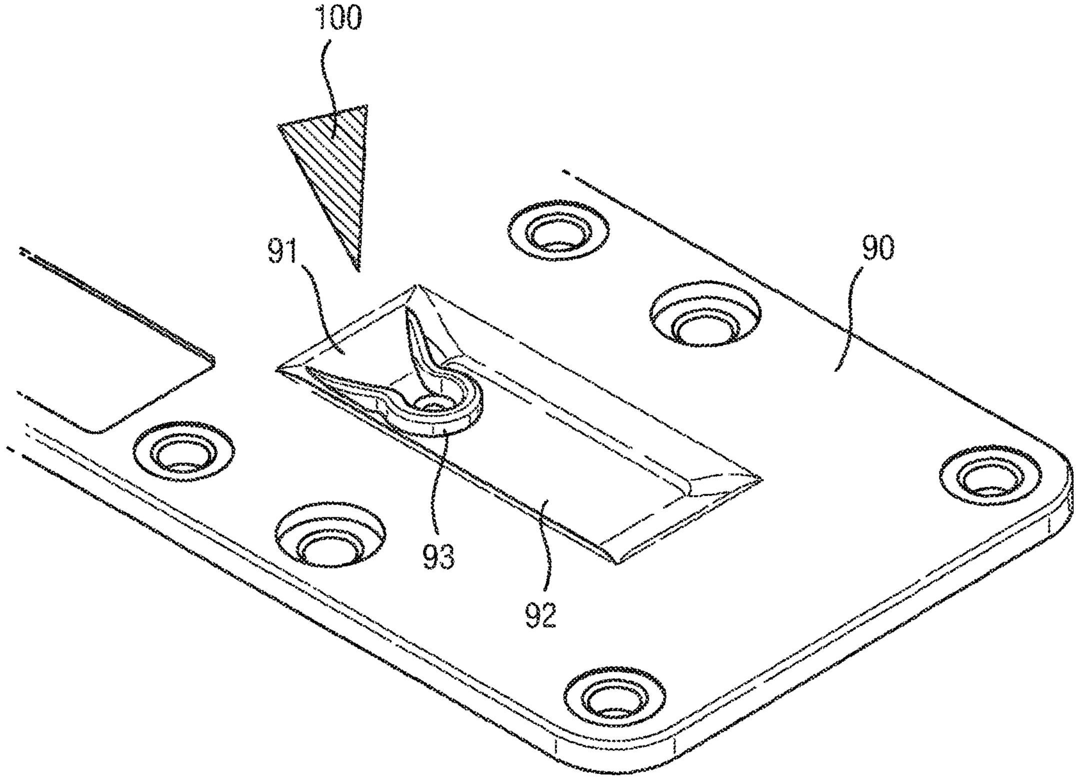
FIG. 9 shows an example design of a guide channel to guide a pipette to the sample input port.

FIG. 9 shows an example design of a guide channel 91 extending from the sample input port 92 of a portion of the device 90. The guide channel tapers outwardly from the port and serves to guide a pipette tip 100 applied to the channel to the sample input port. The guide channel also slopes downwardly towards the sample input port which aids travel of the pipette tip to the port. Once the pipette tip has been guided to the sample input port the user is able to apply liquid sample to the port from the pipette tip. Collar 93 serves to delimit the area of the channel and act as a support for a pipette tip applied directly to the sample input port. Due to the dimensions of the port, which may be for example be 1 mm or less in diameter, it may be challenging for the user to locate the pipette tip directly at the sample input port itself. The outwardly tapering channel area provides a larger target area for the user to locate and guide a pipette tip to the sample input port, should this be required.

The preceding description is provided by way of example.

The invention claimed is:

1. A microfluidic device for analyzing a test liquid comprising:

a sensor provided in a sensing chamber;

a flow path comprising a sensing chamber inlet and a sensing chamber outlet connecting to the sensing chamber for respectively passing liquid into and out of the sensing chamber, and a sample input port in fluid communication with the sensing chamber inlet;

a liquid collection channel downstream of the sensing chamber outlet;

a flow path interruption between the sensing chamber outlet and the liquid collection channel, preventing liquid from flowing into the liquid collection channel from upstream, whereby the device may be activated by completing the flow path between the sample input port and the liquid collection channel;

a conditioning liquid filling from the sample input port to the flow path interruption such that the sensor is covered by liquid and unexposed to a gas or gas/liquid interface;

wherein the device is configured such that following activation of the device, the sensor remains unexposed to a gas or gas/liquid interface and the application of respectively one or more volumes of test liquid to a wet surface of the sample input port provides a net driving force sufficient to introduce the one or more volumes of test liquid into the device and displace buffer liquid into the liquid collection channel, wherein the test liquid is unprocessed; and wherein the device further comprises a removable plug for the sample input port, wherein the plug is configured to avoid any fluid ingress or egress through the sample input port.

2. The microfluidic device of claim 1 wherein prior to activation, the buffer liquid fills from the sample input port to the flow path interruption.

3. The microfluidic device according to claim 1 wherein the sample input port is configured to provide the net driving force.

4. The microfluidic device according to claim 3 wherein the sample input port is configured so as to facilitate a change in shape of the volume of liquid applied to the sample input port, wherein the net driving force comprises Laplace pressure.

5. The microfluidic device according to claim 1, wherein following activation of the device or the introduction of one or more volumes of test liquid, the pressure at the sample input port is substantially equal and opposite to the pressure at the liquid collection channel.

6. The microfluidic device according to claim 1, wherein following activation of the device or the introduction of one or more volumes of test liquid, the interfaces at respectively the sensing chamber inlet and the sensing chamber, and the sensing chamber and the sensing chamber outlet, are configured to avoid draining of liquid from the sensing chamber inlet or the sensing chamber outlet out of the sensing chamber so as to avoid the provision of a gas/liquid interface in the sensing chamber.

7. The microfluidic device of claim 1, further comprising an activation system operable to activate the device.

8. The microfluidic device of claim 7, wherein the flow path interruption comprises a closed valve; and the activation system comprises a mechanism for opening the valve.

9. The microfluidic device of claim 1 wherein the sensor comprises an array of wells, wherein each well comprises a liquid and wherein a membrane is provided across the surface of each well separating the liquid contained in the well from the conditioning liquid in the sensing chamber.

10. The microfluidic device of claim 9, wherein each membrane further comprises a nanopore.

11. The microfluidic device of claim 10, wherein the nanopore is a biological nanopore.

12. A method of filling the microfluidic device of claim 1 with test liquid, the method comprising:

activating the device by completing the flow path between the sensing chamber outlet and the downstream liquid collection channel;

respectively applying one or more volumes of test sample to the wet surface of the sample input port in liquid communication with the downstream liquid collection channel so as to introduce the test liquid into the device, wherein the test sample is unprocessed.

13. The method of claim 12 wherein following activation of the device and prior to the introduction of the one or more volumes of test sample, the device is primed to provide a wet surface at the sample input port in liquid communication with the sensing chamber inlet.

14. The method of claim 12 wherein the device is primed following removal of the plug for the sample input port.

15. The method of claim 14, wherein the step of priming comprises providing priming liquid to the device through the sample input port.

16. The method of claim 14, wherein the step of priming comprises drawing fluid from inside the device into the sample input port.

17. The method of claim 12 wherein a plurality of discrete volumes of test liquid are successively applied to the sample input port in order to successively displace buffer liquid into the liquid collection channel.

18. The microfluidic device of claim 1, wherein the test liquid comprises blood.

19. The method of claim 12, wherein the test sample comprises blood.

20. A diagnostic device for analyzing a test liquid from a patient comprising:

a sensor provided in a sensing chamber;

a flow path comprising a sensing chamber inlet and a sensing chamber outlet connecting to the sensing chamber for respectively passing liquid into and out of the sensing chamber, and a sample input port in fluid communication with the sensing chamber inlet;

a liquid collection channel downstream of the sensing chamber outlet;

a flow path interruption between the sensing chamber outlet and the liquid collection channel, preventing liquid from flowing into the liquid collection channel from upstream, whereby the device may be activated by completing the flow path between the sample input port and the liquid collection channel;

a conditioning liquid filling from the sample input port to the flow path interruption such that the sensor is covered by liquid and unexposed to a gas or gas/liquid interface;

wherein the device is configured such that following activation of the device, the sensor remains unexposed to a gas or gas/liquid interface and the application of respectively one or more volumes of the test liquid to a wet surface of the sample input port provides a net driving force sufficient to introduce the one or more volumes of test liquid into the device and displace buffer liquid into the liquid collection channel, wherein the test liquid from the patient is unprocessed, and wherein the device further comprises a removable plug for the sample input port, wherein the plug is configured to avoid any fluid ingress or egress through the sample input port.

21. The diagnostic device of claim 20, wherein the test liquid comprises blood.

* * * * *